United States Patent [19]
Bailey

[11] 3,725,760
[45] Apr. 3, 1973

[54] AUTOMATIC PLOTTER UTILIZING A COORDINATE GRID DEVICE

[75] Inventor: Knight V. Bailey, Birmingham, Mich.

[73] Assignee: The Bendix Corporation, Southfield, Mich.

[22] Filed: Aug. 12, 1971

[21] Appl. No.: 171,230

Related U.S. Application Data

[62] Division of Ser. No. 805,559, March 10, 1969, Pat. No. 3,647,963.

[52] U.S. Cl. .................318/568, 318/608, 318/653
[51] Int. Cl. ............................................G05b 19/42
[58] Field of Search......318/653, 162, 647, 608, 567, 318/568, 569; 346/29

[56] References Cited

UNITED STATES PATENTS

| | | | |
|---|---|---|---|
| 3,673,584 | 6/1972 | Farrand | 336/129 X |
| 3,376,578 | 4/1968 | Sawyer | 346/29 |
| 3,225,337 | 12/1965 | Jacoby | 318/569 X |
| R27,289 | 2/1972 | Sawyer | 318/135 X |
| 3,304,612 | 2/1967 | Proctor et al | 346/29 X |
| 3,343,072 | 9/1967 | Ihlenfeldt | 318/569 X |

OTHER PUBLICATIONS

Inductosyn – published by Farrand Controls Incorporated, Valhalla, N.Y., dated Sept. 1960.

Primary Examiner—Benjamin Dobeck
Attorney—Lester L. Hallacher

[57] ABSTRACT

A device for determining position coordinates of points on a surface which includes a conducting grid structure having at least two grid elements to be placed over or under a surface and a cursor structure having a circular conducting loop element to be moved across the surface of the grid structure. An alternating electric signal is supplied to either the cursor conducting loop or to each of the conducting grid elements. This signal induces a signal in each element of the unexcited conducting structure. Position coordinates are determined by apparatus which measures the induced signal or signals and records the signal change produced when the cursor is moved across the grid surface. Several embodiments of measuring devices which determine the distance between arbitrary points on a surface such as a map, graph, or photograph are illustrated. Automatic plotting embodiments are also shown and described in which the plotting motion is determined by comparing signals representing the measured loop position on the grid with a preselected set of command signals.

7 Claims, 20 Drawing Figures

INVENTOR.
Knight V. Bailey
BY
ATTORNEY.

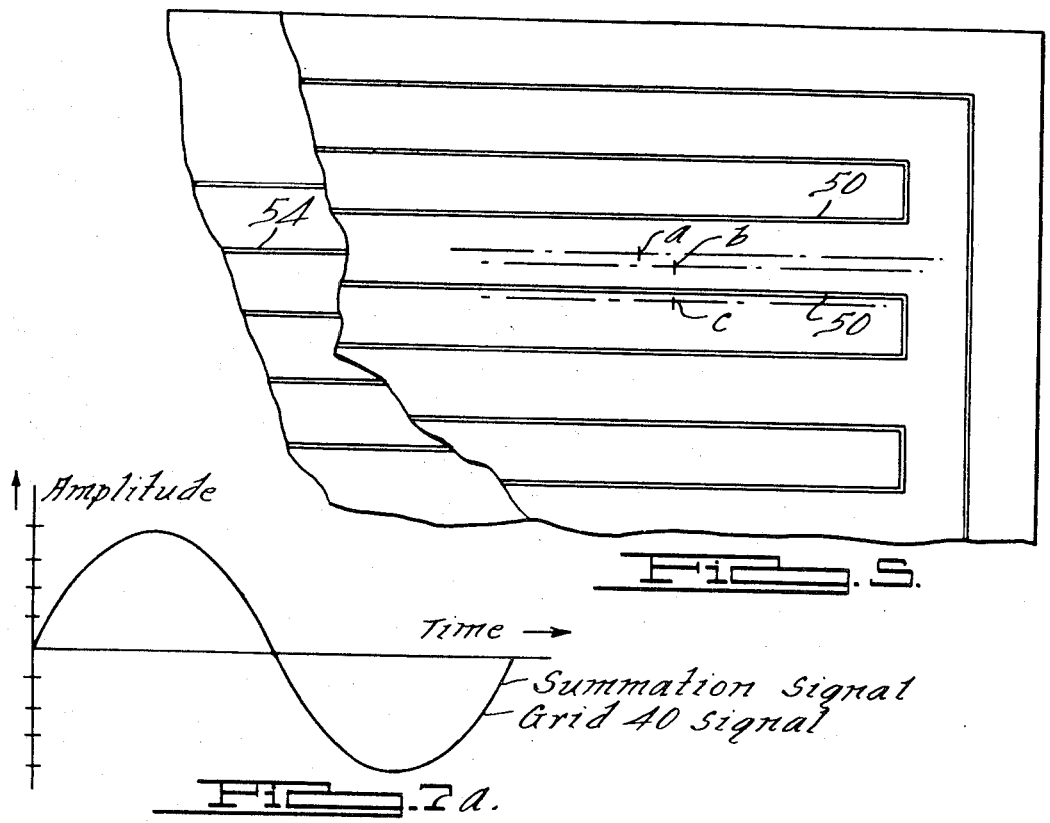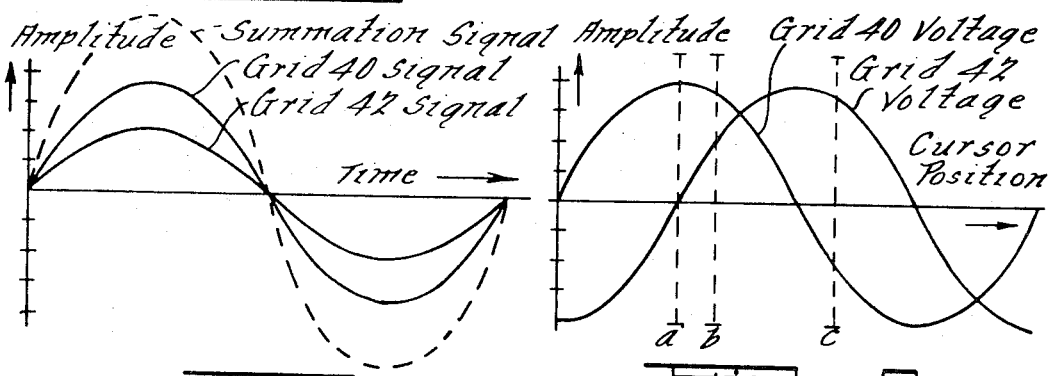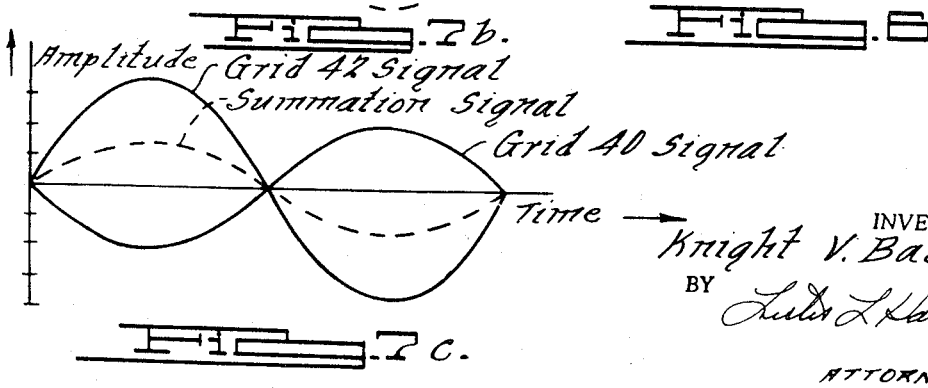

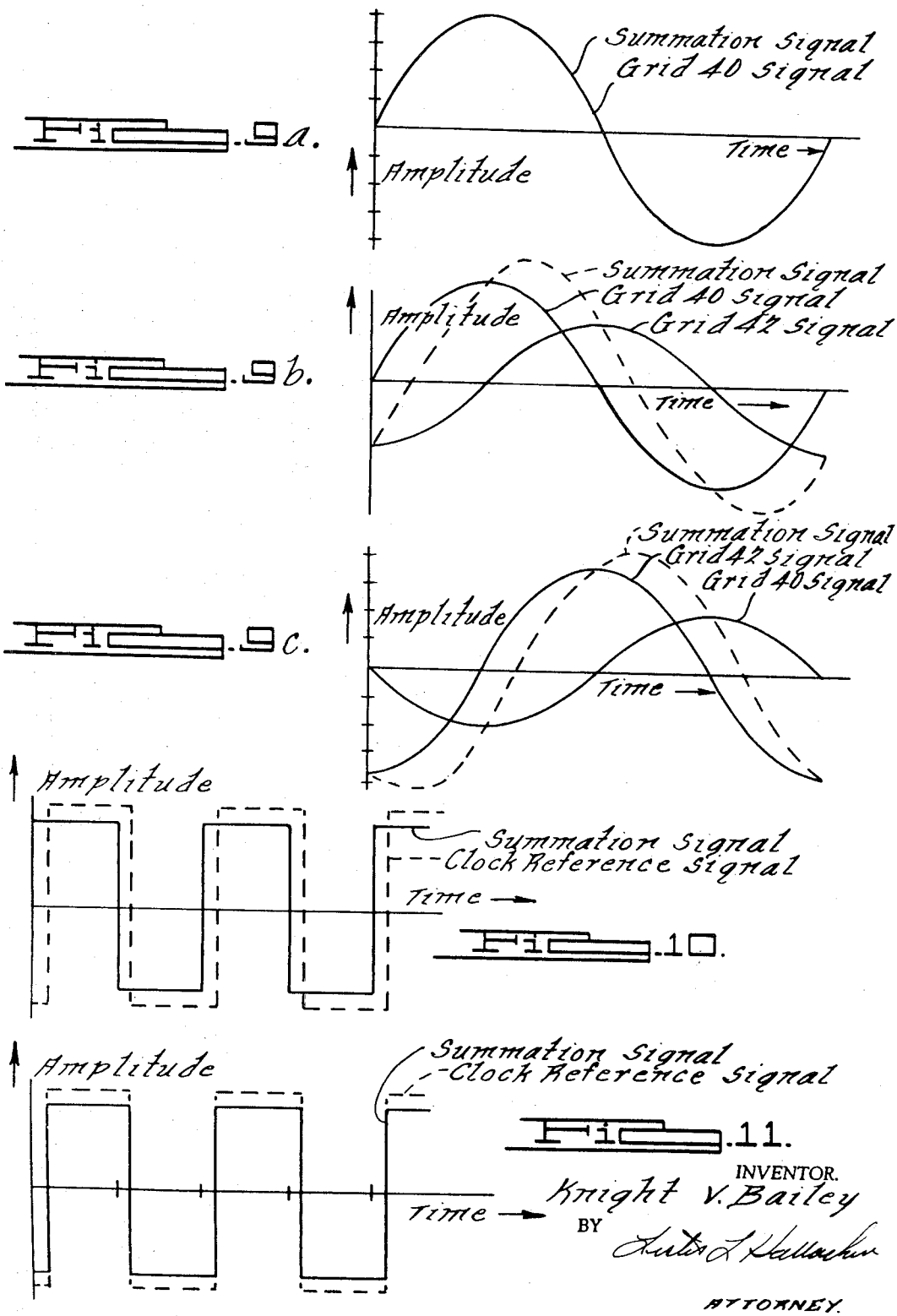

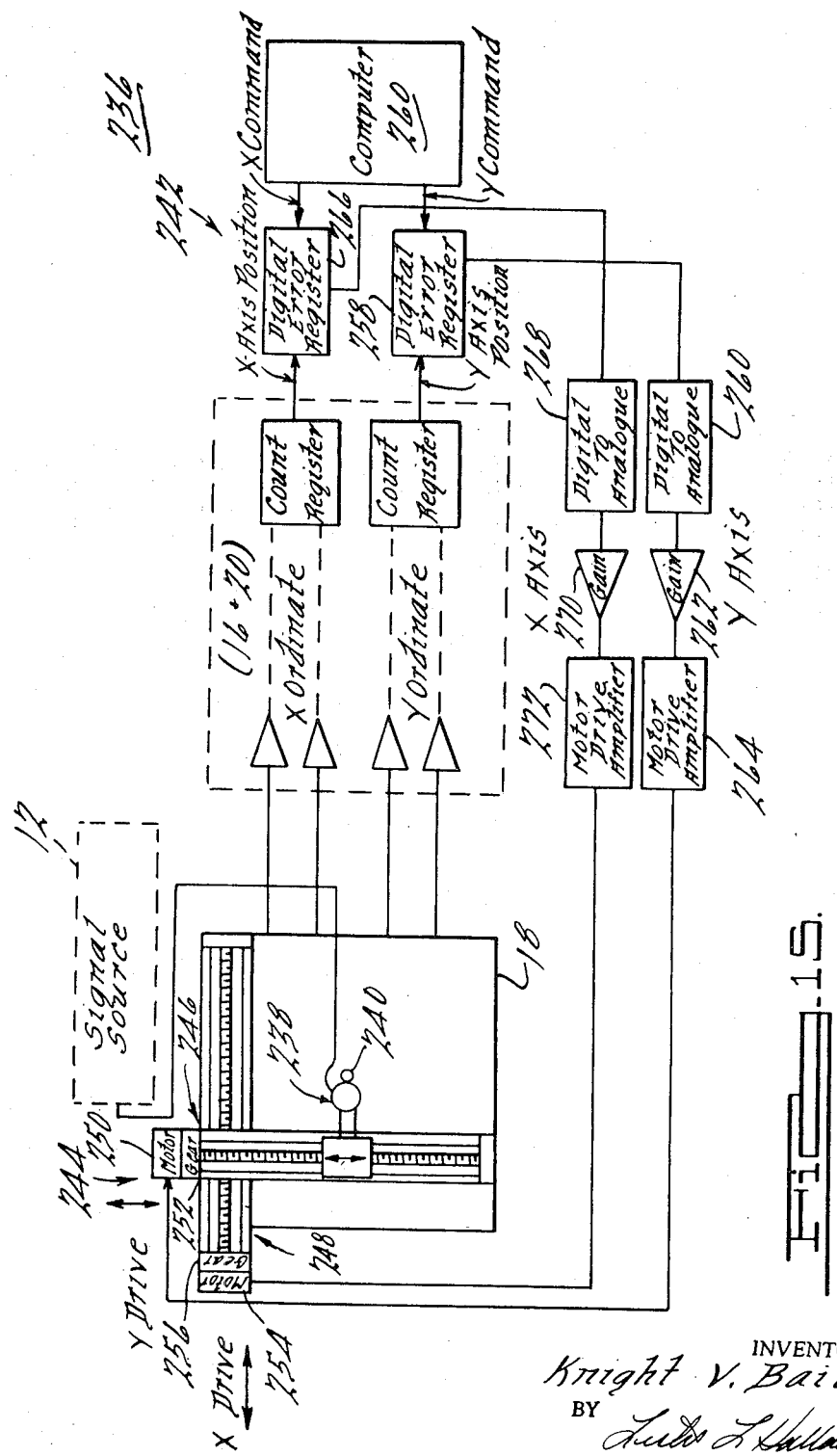

AUTOMATIC PLOTTER UTILIZING A COORDINATE GRID DEVICE

CROSS-REFERENCE TO RELATED APPLICATIONS

This is a divisional application of application Ser. No. 805,559, filed now U.S. Pat. No. 3,647,963 Mar. 10, 1969, by Knight V. Bailey, also assigned to The Bendix Corporation.

BACKGROUND OF THE INVENTION

1. Field of the Invention

A device for determining position coordinates of points on a surface.

2. Description of the Prior Art

There are a number of purely measured devices which attempt to rapidly and accurately provide the position coordinates of points on a surface to determine distances between points. One such device comprises a multiple grid structure wherein each grid includes sets of closely spaced, long parallel conductors. The parallel conductors of one grid run perpendicular to the parallel conductors of the other. Measurement is made by moving a conducting probe formed in the shape of a pencil point across the grid surface. The probe is energized by an alternating electric signal which produces a capacitive coupling between the probe and the grids and therefore induces a voltage in the grid wires located in the near vicinity of the probe. Electronic circuitry determines probe position by a simple amplitude discrimination which identifies the grid wire nearest the probe. A major objection to this device is that resolution is determined by the spacing between parallel grid conductors and is therefore inherently limited. Greater accuracy is achieved as the parallel conductors are moved closer together. But when an amplitude discrimination system is used, it is necessary to maintain enough spacing between the grid wires to insure that definite points of maximum voltage exist on the grid. If the conductors are spaced too closely together, it will not be possible to tell which conductor is receiving the largest induced voltage and is therefore closest to the point probe. Also, since amplitude discrimination measures the total distance between the probe point and the grid wire, the measurements recorded will depend on the exact height of measuring probe above the grid as well as the distance moved across the grid.

Another device which measures distance along one ordinate includes a movable conducting grid structure which contains one grid element which is moved across a second, stationary grid structure containing two grid elements. The three grid elements are identical. All have equally spaced, parallel conductive portions which are alternately connected at their end points so that the grid elements comprise continuous conductive elements which define long, adjacent parallel loops. The conducting grid structures are first aligned so that the parallel conductive portions of each grid element run parallel to the parallel conductive portions of the other two grid elements. The grid structures are then placed over a surface to be measured. An alternating current electric signal is supplied to the movable grid structure, and this signal induces a signal in the grids of the second grid structure. This device avoids many of the problems inherent in the previously described device because the position of the movable grid structure with respect to the stationary grid structure is determined by comparing the signals induced in the two grid elements of the stationary grid structure with each other. Motions such as a lifting of the movable grid structure slightly away from the stationary grid structure will not produce erroneously position measurements with this device. A lifting of the movable grid structure will simply decrease both of the induced signals. Moving the movable grid structure across the stationary grid structure will change one induced signal with respect to the other.

The most serious limitation of this device is simply that it will measure distance only along one axis, that is, the axis running perpendicular to the long, parallel conductive portions of the three grid elements. Therefore, in order to measure the distance between the grids two points must be positioned along the straight line connecting the two points in question. Either the grid structures or the surface being measured must therefore be moved and realigned before almost every measurement. This limitation, which restricts positioning determining capability to be along a single ordinate, clearly eliminates any possibility for such structure to be incorporated into an automatic plotter which must be able to operate along all possible line paths.

Conventional plotters include a plotting pen attached to mechanical drive apparatus which moves the pen in any desired direction across a plotting surface. Pen position is determined by measuring the position of elements of the mechanical drive apparatus. For example, in one conventional device the pen is attached to a first lead screw assembly which extends over a plotting surface. This first assembly is attached to a second lead screw assembly placed at one edge of the plotting surface and perpendicular to the first lead screw. Pen position is determined by measuring the rotational position of the lead screws, which are calibrated in terms of linear position. However, since the actual position of the pencil or drawing means is not measured, errors are introduced to such systems if the lead screws are thrown out of alignment so that they are not orthogonal to each other or parallel to the edges of the plotting surface, or if the relationship between pencil position and the position of the drive mechanism is incorrectly calibrated. 1

SUMMARY OF THE INVENTION

This invention comprises unique conducting grid and cursor designs, which when incorporated into position determining devices provide output electrical signals which indicate with extreme accuracy the position of the cursor on a grid structure. This invention also includes several unique apparatuses for measuring the electrical signals which indicate cursor position. Further, this invention encompasses complete, unique position determining devices. The position determining apparatus of this invention can be embodied in a number of devices which include such things as measuring devices and automatic plotting devices. The apparatus of this invention includes means for providing an excitation signal to either a conducting grid structure or a conducting cursor structure, and means for measuring a signal induced by the excitation signal to determine cursor position on the grid structure. Measuring devices simply transmit signals indicating cursor position to an output display device. The illustrated plotting devices compare output signals which represent cursor position to preselected command signals which represent particular positions on the surface of the grid structure. The signal differences between the measured signals and the command signals are then used to operate drive apparatus for moving the cursor to the position represented by the command signals. The illustrated embodiments show measuring devices and plotting devices for operating on a single surface. This invention can also be embodied in devices such as stereoplotters.

Each embodiment shown herein includes apparatus for supplying an alternating current excitation signal to either a grid or cursor structure which induces an electrical signal in the unexcited conducting structure. Each embodiment also includes apparatus for processing and identifying induced signals to determine the position of the conducting cursor on the conducting grid structure.

Further, each of the embodiments shown herein of this invention include a grid structure or grid array having at least two grid elements printed on nonconductive backings. Each grid element comprises a single, continuous electric conductor that is folded or convoluted to form a plurality of equally spaced, long, parallel conductive portions that are alternately connected at their end points by shorter conducting portions. As used herein, the word "convoluted" is to be interpreted in accordance with the definition presented in Van Nostrand's *Scientific Encyclopedia*, 4th Edition. The long, parallel conducting portions of one grid element are placed perpendicular to the long, parallel conducting portions of the other. Each of the cursors illustrated herein to be moved across the surface of this grid structure include at least one conductive loop-shaped element having a transverse dimension equal to an odd multiple of the spacing between two adjacent long, parallel conducting grid portions. When an alternating current excitation signal is supplied to either the elements of the grid or cursor structures, an electric signal whose maximum amplitude, or in other words voltage, varies sinusoidally as the cursor is moved across the surface of the grid structure is induced in the unexcited conductive elements. This signal variation provides data which can be processed to provide a very accurate indication of cursor position. Further, an accurate measurement is obtained with this invention regardless of where the cursor is initially placed on the surface of the grid structure, and regardless of how small or how great a distance the cursor is moved.

The embodiments shown herein of this invention illustrate various devices for measuring the change in an induced signal caused by cursor movement and therefore provide an output indication of cursor position. One embodiment of this invention shown herein illustrates amplitude ratio measuring apparatus which accurately indicates the coordinate position of a cursor on a grid structure by comparing the amplitude of a signal induced in one grid element with the amplitude of a signal induced in an offset grid element. The amplitudes of these two signals vary with respect to each other as the cursor is moved across the surface of the grid structure. Other embodiments illustrate several different phase measuring constructions which measure cursor position by comparing the phase of a summation induced signal having signal components from several offset conductive grid elements with the phase of a reference signal. The phase of the summation signal shifts as the cursor is moved across the surface of the grid structure. Each illustrated embodiment provides an extremely accurate measurement of cursor position. Further, each of the embodiments is constructed such that a slight lifting of the cursor away from the surface of the grid structure will not cause the apparatus to provide an erroneous determination of coordinate position.

Visualizing the signals produced using cursor loops or probes having dimensions other than those taught by this invention clearly indicates that a cursor having a single loop with a transverse dimension equal to an odd multiple of the spacing between adjacent parallel grid portions provides a signal which more accurately indicates cursor position than do probes or loops having other sizes. A probe having a loop dimensioned smaller than adjacent conductor spacing will permit operation in the intended manner because a loop must have a finite dimension, and with the parallel conductors of the grid closely spaced the loop diameter will be appreciable with respect to such spacing. However, such a cursor will not operate as efficiently as a probe having a dimension equal to an odd multiple of conductor spacing, because the voltage induction contribution with respect to each grid conductor will not be the same.

Choosing a symmetric loop with a transverse dimension equal to an even multiple of the spacing between two adjacent parallel conducting portions provides no net induced signal whatsoever. With a loop of such dimensions, the signal induced in one parallel conducting grid portion will exactly cancel the signal induced in another parallel portion. These two induced signals will cancel each other no matter where such a cursor is placed on the grid. Thus, it is clearly seen that the most meaningful signal is provided when using a symmetric cursor loop having its largest transverse dimension equal to an odd multiple of the spacing between adjacent parallel grid portions, and that as this transverse dimension is varied from this preferred condition toward one or the other of the two extreme cases just discussed, the signal becomes much less meaningful.

The phrase "signal induced with respect to" a particular conductive element is used herein to describe a signal induced by an excitation signal, because with this invention an induced signal that varies in proportion to cursor displacement is provided if an excitation signal is supplied to either a grid or cursor element. Therefore, a signal "induced with respect to" a particular cursor includes both the signal induced in that cursor if an excitation signal is supplied to a grid element, and the signal induced in a grid element by an excitation signal supplied to the cursor. Signals induced "with respect to " a grid element of this invention indicate cursor displacement along an axis running perpendicular to the long, parallel conducting sections of that grid element. Each of the coordinate position determining devices shown herein include means for providing two induced signals indicating displacement of a cursor along a grid ordinate. These two signals are provided to eliminate ambiguities as to the interpretation of measured results when only a single signal indicating displacement along one coordinate is provided. In a number of embodiments, signals which indicate the coordinate position of a cursor on the surface of a grid structure are provided by a cursor having a single, circular conducting loop and a grid structure having four grids with the long, parallel conducting portions of two of the grids running parallel to the X axis of the grid structure and the long, parallel conducting portions of the other two grids running parallel to the Y axis of the grid structure. The conducting grids with long, parallel conducting sections running parallel to each other are displaced slightly from each other so that an excitation signal will provide different signals induced with respect to each of the parallel grids. One embodiment of this invention provides the desired two difference induced signals for indicating cursor position along an ordinate by using offset cursor conducting loops instead of offset parallel grids.

Other novel features illustrated by the various embodiments of this invention include the illustration of a cursor having a single circular, conducting loop element with a diameter equal to an odd multiple of the spacing between adjacent long, parallel conducting portions. It is advantageous to use such a cursor in many embodiments of this invention because cursor rotations will not affect measurements of coordinate position. Another embodiment illustrates a cursor having two offset, circular, conducting loops which when used with a grid structure having four separate grid elements provides induced signals which can be processed to determine both a coordinate position and the angular orientation of the cursor.

The various embodiments of this invention shown herein illustrate different novel elements of this invention. It is understood that any particular novel structure incorporated in a particular embodiment shown herein could also be incorporated in any of the other embodiments shown herein and in a great number of embodiments not shown herein. For example, a particular novel grid structure or signal identifying apparatus incorporated in, say, a position measuring device in which an excitation signal is supplied to a cursor to induce signals in the elements of the grid structure, could also be incorporated in, say, an automatic plotting device in which excitation signals are supplied to the elements of the grid structure to induce signals in a cursor.

BRIEF DESCRIPTION OF THE DRAWINGS

Further objects, features, and advantages of this invention will become apparent from a consideration of the following description, the appended claims, and the accompanying drawings.

FIG. 5 is an enlarged view of a portion of FIG. 4.

FIG. 6 is a graph illustrating the maximum amplitude of the signals induced with respect to the two grids shown in FIGS. 4 and 5 for different positions of the cursor.

FIGS. 7a, 7b and 7c graphically illustrate alternating current signals associated with the maximum signal amplitudes illustrated in FIG. 6. FIGS. 7a, 7b and 7c illustrate one complete Hertz of two grid signals and their summation signals for three different, specific cursor positions.

FIGS. 9a, 9b and 9c graphically illustrate the alternating current signals illustrated in FIG. 7 with one of the signals shifted in phase by 90°. FIGS. 9a, 9b, and 9c illustrate one complete Hertz of the phase shifted and unshifted signals and their summation signal for the three specific cursor positions illustrated in FIGS. 7a, 7b, and 7c.

FIG. 10 is a graph which illustrates a summed and processed induced signal shifted by 30° with respect to a reference signal. This phase shift is caused by cursor displacement.

FIG. 11 is a graph which shows the induced and reference signals of FIG. 10 with the reference signal shifted by the apparatus of this invention to be in phase with the induced signal.

FIG. 15 is a schematic diagram which illustrates the position determining apparatus of this invention embodied in an automatic plotting device.

DETAILED DESCRIPTION OF THE PREFERRED EMBODIMENT

Figure 1:
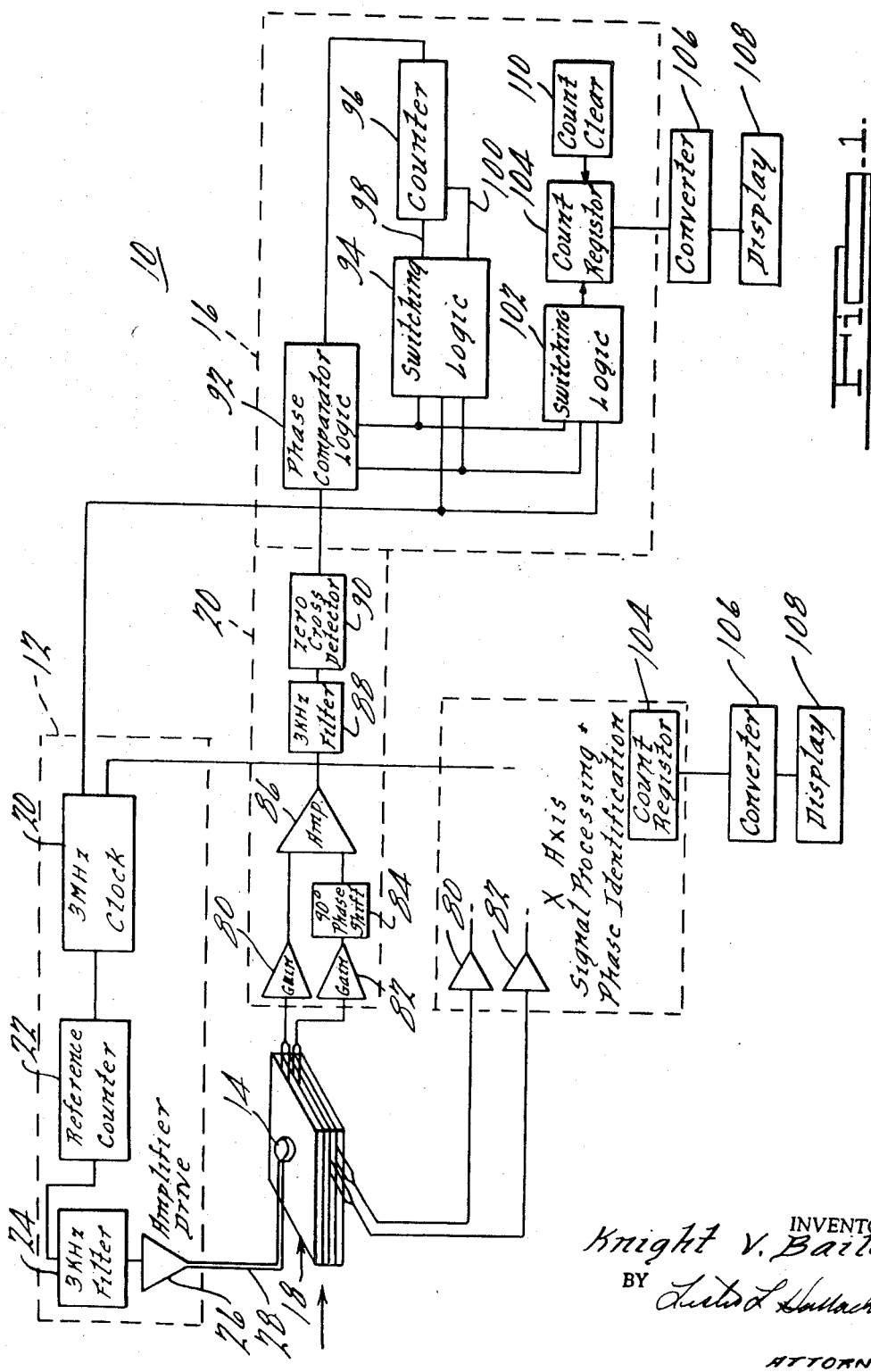
FIG. 1 is a schematic diagram illustrating the position determining device of this invention embodied in a measuring device.

1. Description of the Position Measuring Apparatus of FIG. 1 Using the Detailed Relationships and Operative Information Provided in FIGS. 2-10
    a. General Description The embodiment of FIG. 1 illustrates a measuring device 10 which includes signal generating apparatus 12 which transmits an alternating current excitation signal to a cursor 14 and another alternating current signal to phase identifying apparatus 16. The excitation signal supplied to the cursor 14 acts to induce a plurality of signals in a grid structure 18. These induced signals are transmitted to a signal processing apparatus 20 which produces a summation signal whose phase shift is in proportion to displacement of the cursor 14 across the surface of the grid structure 18. This phase shift is measured by the phase identifying apparatus 16 which provides an output signal indicating cursor displacement from an arbitrarily selected reference point on the surface of the grid structure 18.

The alternating current signal producing apparatus 12 includes a clock signal source 20 which emits a 3 MHz alternating current squarewave signal. This signal is sent both to the phase identifying apparatus 16 and to a reference counter 22 which divides the 3MHz signal by 1,000 to provide a 3KHz, squarewave AC signal. The 3KHz signal emitted from the counter 22 is transmitted to a 3KHz filter 24 which combines selected signal overtones, filters unwanted overtones, and filters out unwanted noise signals to provide a pure sinusoidally varying 3KHz signal. This signal is then amplified by a drive amplifier 26 and transmitted through a coaxial cable 28 to the movable cursor 14.

b. Grid Array and Cursor Design

Figure 3:
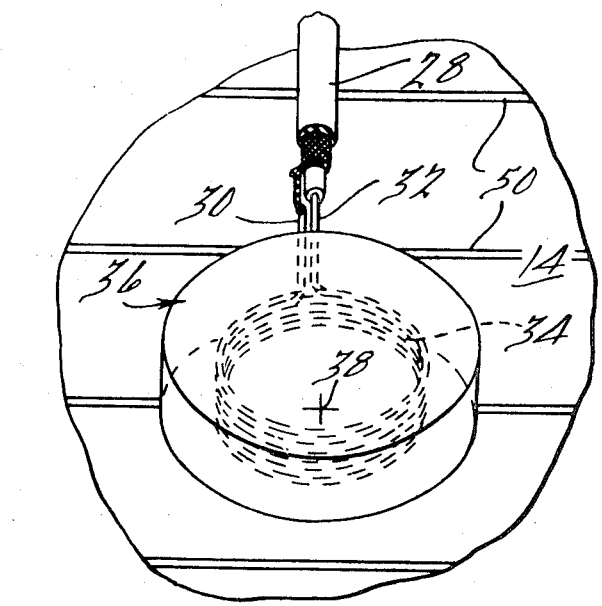
FIG. 3 is a further enlarged perspective view of the cursor shown in FIG. 2.
Figure 4:
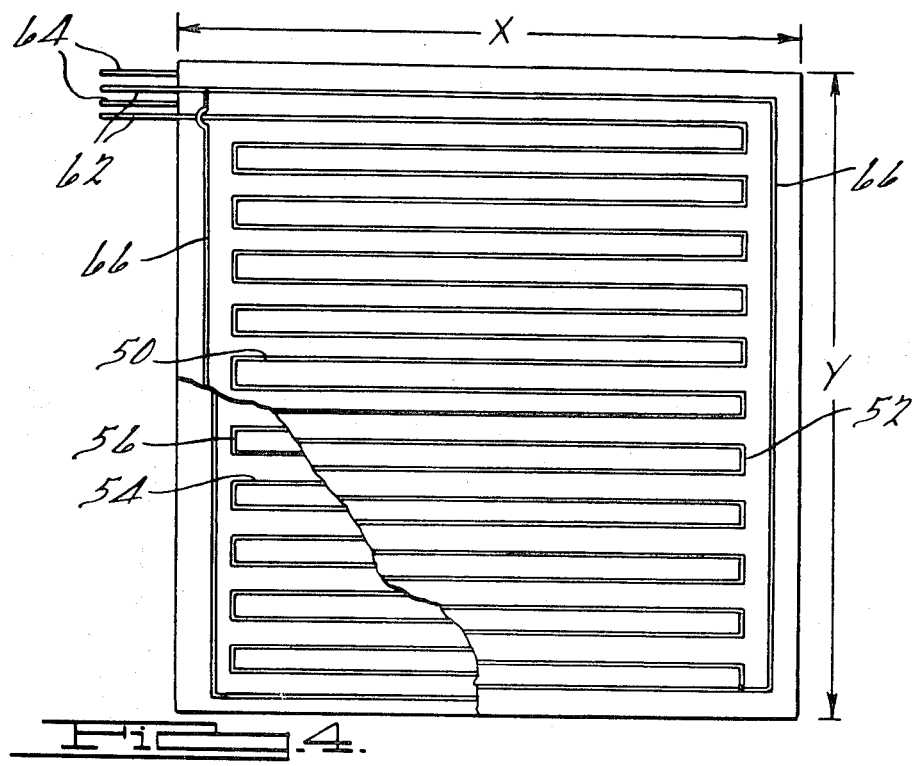
FIG. 4 is an enlarged cutaway view, partly schematic, showing two of the grid elements included in the grid structure illustrated in FIGS. 1 and 2.

An enlarged view of the coaxial cable 28 and cursor 14 is provided in FIG. 3. The individual conductors 30 and 32 of the coaxial cable 28 divide to form a conducting, circular loop element 34 of the cursor 14. The loop 34 includes a number of windings so that a more intensified signal is available to induce an alternating electric signal in the grid elements of the grid structure 18 than would be the case for a single circular winding. The circular loop 34 is held in a molded, plastic head 36, formed, at least in the area withing the circular loop 34, of a clear plastic, so that an operator can see the surface over which the cursor is being moved. A cross-hair pattern 38 is formed on the bottom surface of the cursor head 36 at the center of the circular loop 34 to further assist an operator in placing the cursor precisely over particular positions of interest on a surface.

The grid structure 18 (FIG. 2) includes four individual grid elements 40, 42, 44, and 46. The grids are shown as printed circuits formed on four identical epoxy glass backings 48. The grid elements are identical. So for illustration consider grid 40 which comprises a single, printed, continuous electric conductor that is convoluted or bent to form a plurality of equally spaced, long, parallel portions 50 which are alternately connected at their end points by the shorter conducting portions 52. The diameter of the circular conducting loop 34 included in the cursor 14 is equal to an odd multiple of the spacings between two adjacent long, parallel conducting grid portions 50. As used herein, the term "odd multiple" includes the number one. When the cursor is moved across the grid 40 in a direction perpendicular to the long, parallel conducting portions 50, a 3KHz signal whose maximum amplitude varies sinusoidally in response to cursor displacement is induced in the grid 40. This direction will now be arbitrarily defined as the Y ordinate of the grid structure 18 and will be referred to as such hereinafter. The graphed values labeled "grid 40 voltage" on FIGS. 6, 7a, 7b, and 7c illustrate this change in the maximum amplitude of the signal induced in grid 40 as the cursor is moved along the Y coordinate of that grid. This change in the maximum amplitude of the induced signal can also be referred to as the change in the induced voltage.

Since, as FIG. 6 illustrates, when the cursor 14 is moved along the Y axis of grid 40 the induced voltage varies sinusoidally with cursor displacement, it can be seen that these two conductive elements provide an induced voltage which more accurately represents cursor position than has previously been obtained with other grid and cursor designs. Note, however, that the single grid 40 voltage illustrated in FIG. 6, which is produced using the single loop cursor 14 and the one grid 40, does not provide a completely unambiguous indication of cursor position. For each point on the rising slope of the grid 40 voltage curve, there exists a point having an equal amplitude and carrier polarity on the falling slope of that curve. Therefore, a second grid 42, referred to herein as a quadrature grid, which runs parallel to the grid 40 and is placed directly below it is included in the grid structure 18 to assist in providing a completely unambiguous measurement of cursor position. The grid 42 is similar to the grid 40 and also comprises a single, printed, continuous electric conductor having a plurality of equally spaced, long, parallel portions 54 which are alternately connected at their end points by the shorter conducting portions 56. The long, parallel conducting portions 54 of grid 42 are equal in length to and run parallel to the long conducting portions 50 of grid 40. Further, the spacing between the conducting portions 54 is equal to the spacing between the conducting portions 50 of grid 40. However, as can be best seen in FIG. 4, the printed circuit structure of grid 42 is shifted with respect to the grid 40 so that each of the parallel conductors 54 are displaced a preselected distance in the Y direction from the conductors 50 of grid 40. In the embodiment shown in FIG. 4, the conducting sections 54 of grid 42 fall halfway between each of the conducting sections 50 of grid 40. Thus, when a circular conduction loop is placed over the grid structure 18 and excited with an AC signal, signals having two different maximum amplitudes will be induced in the grids 40 and 42. Note the grids 40 and 42 provide only cursor coordinate position along the Y axis of grid structure 18. The grids 44 and 46, which appear directly below the grids 40 and 42 and and run perpendicular to those grids provide coordinate position along the X axis of grid array 34. The grids 44 and 46 are identical to the grids 42 and 44 and are arranged with respect to each other as are the grids 40 and 42. That is, the long, parallel conductive portions 58 of grid 44 appear directly above and midway between the long, parallel conductive portions 60 of grid 46. Therefore, to avoid repetition, no detailed description of those grids will be provided. Similarly, the signal processing apparatus 20 and phase identification apparatus 16 for receiving signals from the grids 44 and 46 and determining X coordinate cursor position is also identical to the apparatuses 20 and 16 shown for receiving signals from grids 40 and 42 and will not be described in detail.

An understanding of the manner in which the signals induced in grids 40 and 42 change as the cursor 14 is moved along the Y axis of grid structure 18 is provided by viewing FIGS. 5, 6, and 7. The points a, b, and c designated on FIG. 5 indicate the position of the cursor 14 when the cursor cross-hair pattern 38 is placed directly above one of those points. The maximum amplitudes of the signals induced in the grids 40 and 42 when the cursor 14 is placed at one of those points are indicated with the letters a, b, and c respectively on FIG. 6. The induced signals themselves and their summation signal produced for the three cursor positions a, b and c are graphed in FIGS. 7a, 7b, and 7c, respectively. Note that FIGS. 5 and 6 show that the induced signals vary through one complete maximum signal amplitude cycle as the cursor is moved a distance equal to twice the spacing between adjacent long, parallel conductive portions 50. FIG. 5 shows point b displaced from point a a distance along the Y axis of grid 40 equal to one-third the distance between point a and the next adjacent parallel conducting portion 50. FIG. 6 shows point b displaced from point a a distance of 30° or one-twelfth of a cycle along the sinusoidally varying graphed values of FIG. 6. Similarly, point c is displaced from point b a distance equal to one-half the spacing between adjacent parallel grid conducting portions 50 shown on FIG. 5, and is displaced one-fourth cycle from point b on the graph of FIG. 6. The signals induced in the grid 40 and 42 are therefore represented by the mathematical equations:

$$E_{40} = E \sin (y/d \times 360°) \sin \omega t \quad \text{and}$$

$$E_{42} = E \cos (y/d \times 360°) \sin \omega t \quad \text{where}$$

$E$ = the maximum amplitude of the induced signal value that can be obtained from a signal grid using a given excitation potential. This amplitude is illustrated at point a on FIG. 5.

$y$ = linear displacement along the Y axis of grid structure 18.

$d$ = twice the distance between adjacent, long, parallel grid conducting portions of a grid.

$\omega$ = frequency (3KHz in this embodiment).

$t$ = time in seconds.

Note that point b, as well as being displaced from point a along the Y axis of grid 40, is also displaced from point a a distance along the X axis of that grid. This lateral displacement will not be indicated in any way by a change in the induced signal measured across the leads 62 and 64 (FIG. 4) to the grids 40 and 42. Only the component of motion in a direction perpendicular to the long conducting sections 50 and 54 will produce a change in the signal induced with respect to these two grids. Since each of the grids forming the grid structure 18 are designed to measure position only along one axis, the induced signals caused by electrical coupling between the short, connecting portions 52 and 56 of a grid and the cursor, produced when the cursor nears those portions, must be accounted for. It can be seen from either FIG. 3 or 4 that the voltage induced in, say, the connecting portions 52 of grid 40 does not indicate the position of a movable cursor along the Y axis. If a cursor is moved along the X axis of grid structure 18 while keeping its position with respect to the Y axis constant, the signal measured across the leads 62 of grid 40 will be slightly larger when the cursor is near a connecting portion than when it is near the center of the grid. Since any change in the signal coming from grid 40 is interpreted as indicating motion along the Y axis, if the signal induced in the connecting portion 52 were allowed to reach the phase identifying apparatus 16, errors would be introduced into the position measurements provided. Therefore, the encircling conducting section 66 is included as part of each of the printed grids forming the grid structure 18 for the purpose of providing a signal to cancel the signal induced in the portions 52. The encircling section 66 runs parallel to and close to the connecting portions 52 so that when a cursor is placed near a connecting portion 52 and induces a signal in that section, an electric signal will also be induced in the encircling conductor 66. Note that the two signals induced in the conducting sections 52 and 66 will be substantially equal and electrically opposed to each other, thereby cancelling each other so that no net electric signal is provided in the grid 40 which can be measured across the leads 62.

Figure 8:
FIG. 8 is a partial plan schematic view of an alternate grid element design from the grid elements illustrated in FIGS. 1, 2, 4, and 5.

FIG. 8 illustrates an alternate grid winding designed to negate the effect of induced error signal provided by the coupling between the cursor and the shorter connecting portions of a grid. The grid element 68 shown in FIG. 8 is similar to the grids comprising the grid structure 18 in that it is formed from a single, printed, continuous electrical conductor that has long, parallel conducting portions 70 connected at their alternate end points by the shorter conduction portions 72. However, unlike the grids forming the grid structure 18, the continuous conductor forming the grid 68 is folded back along itself so that long, parallel conducting portions 74 run parallel to and are placed close to the conducting portions 70. Further, the conducting portions 74 are connected at their end points by shorter conducting portions 76 which run parallel to and are spaced between the end portions 72. As the cursor 14 is moved near the connecting portions 72 of the grid 68, a signal will be induced with respect to those portions. If the portions 76 did not exist, the signals induced with respect to the portions 72 would cause an error indication to be read across leads 78 of this grid. Note, however, that grid 68 is constructed such that, when a signal is induced in a connecting portion 72, there will be a connecting portion 76 close enough to that portion so that there will also be a signal induced in a portion 76. The two signals induced in the two connecting portions are equal and electrically opposed to each other and will therefore cancel. Also, if an excitation current is supplied to the grid 68 rather than to the cursor 14, the excitation current traveling in a conducting portion 72 will be opposed by the excitation signal traveling in an adjacent portion 76. There will therefore be no net current induced in the cursor caused by an electrical coupling with the connecting edge portions of the grid 68.

Grids such as the grid 40 have an advantage over grids such as grid 68 in that they are somewhat easier to construct. Grid 40 has no conductive portions such as the portions 74 which are placed extremely close to the portions 70. Grid 68 has the advantage, however, that there will be an inductive coupling between cursor 14 and both the conducting portions 70 and 74. Grid 68 therefore provides a stronger induced signal, everything else being equal, than can be provided with a grid such as grid 40.

c. Signal Processing & Phase Identification Apparatus

FIGS. 6 and 7 indicate that the maximum amplitudes of the signals induced in grids 40 and 42 by the excitation signal supplied to the cursor 14 vary as the cursor is moved along the Y axis of grid structure 18. However, the phase of the induced signals does not change in a manner which accurately indicates cursor displacement. Note that FIG. 7 shows that the signals induced in grid element 40 and 42 and their summation signal are always either perfectly in phase with each other, or that one of the signals will be exactly 180° out of phase with the other two. The position determining device 10 (FIG. 1) therefore includes a signal processing apparatus 20 which receives the induced signals from grids 40 and 42, and produces a signal whose phase shift is in proportion to cursor displacement. The signals from the grids 40 and 42 are first amplified by gain amplifiers 80 and 82, respectively, so that stronger and therefore easier signals to work with are obtained. A phase shifting apparatus 84 then shifts the phase of the signal from the quadrature grid 42 by 90°, or one quarter cycle. This phase shift does not change the induced voltage values. The manner in which the induced voltage changes as the cursor 14 is moved across the surface of the grid structure 18 is still as illustrated by FIG. 6. However, the phase relationship of the two induced alternating current signals to each other is changed. This relationship for the three cursor positions a, b, and c is shown by the graphs of FIGS. 9a, 9b, and 9c, respectively. The unshifted signal from grid 40 and the 90° phase shifted signal from grid 42 are then summed in the summation amplifier 86. FIG. 9 also illustrates the summation induced alternating current signal produced by the summation amplifier 86 for the three cursor positions indicated.

FIG. 9a shows the waveform with the cursor 14 at point a of FIG. 5. There will still be no net signal induced in the quadrature grid 42 because the center point of cursor 14 is directly over one of conductors 54. Therefore, the summation signal produced by summation amplifier 86 will simply equal the signal coming from the amplifier 80 when the cursor is at point a. FIG. 9b illustrates the induced grid 40 signal, and the quadrature grid 42 signal, both of which are summed by amplifier 74, and the summation signal provided by the summation amplifier when the cursor is at point b on the grid structure 18. Because the phase of the signal coming from the quadrature grid 42 has been shifted 90° with respect to the signal from the grid 40, the summation signal produced by the summation amplifier 86 when the cursor is at point b is shifted by one-twelfth of a cycle or 30°, from the summation signal illustrated in FIG. 9a. Note, as was the case for the signals shown in FIG. 7, the maximum amplitudes of the alternating current signals from the grid 40 and the quadrature grid 42 vary in accordance with the changes in cursor position. Note, however, than even though the maximum amplitude of these two signals changes, the maximum amplitude of the summation signal illustrated in FIG. 9b has not changed from that shown in FIG. 9a. Only the phase of that signal has been shifted.

FIG. 9c illustrates the grid 40, quadrature grid 42, and summation signals produced when the cursor is at position c. Note that, as was the case previously, the maximum amplitudes of the signals coming from grid 40 and quadrature grid 42 have changed as indicated in FIG. 7, but that the maximum amplitude of their summation signal has not changed. However, the phase of the summation signal produced with the cursor at point c is shifted by 90° from that produced with the cursor at point b. Thus, a signal whose phase shifts in direct proportion to cursor displacement is provided. This summation signal ($E_{sum}$) produced by the summation amplifier 86 is given precisely by the mathematical expression:

$$E_{sum} = A E \sin(y/d \times 360°) \sin t + A E \cos(y/d \times 360°) \cos \omega t$$

where:
$A$ = an amplification factor provided by the processing apparatus (20) and
The remaining symbols are as previously defined.

Manipulating the above in a straightforward mathematical fashion produces:

$$E_{sum} = A E \sin(y/d \times 360° + \omega t)$$

Thus, this mathematical expression confirms the illustration of FIG. 9 which shows that the signal leaving the summation amplifier 86 is an alternating current signal whose phase shifts linearly and in direct proportion to any displacement of the cursor along the Y axis of grid structure 18.

This summation signal is filtered by a 3KHz frequency filter 88 which removes unwanted noise signals and overtones from the summation signal and provides a pure sine wave signal for further processing. A zero cross-over detector 90 detects the node or zero signal value points of this sinusoidally varying summation signal and amplifies said signal, thereby converting the sinusoidally varying summation signal shown in FIG. 8 to the summation squarewave signal shown in FIGS. 10 and 11. This summation squarewave signal is transmitted to the phase identifying apparatus 16 which provides an output signal indicating cursor position by measuring the phase change of this summation squarewave signal produced when the cursor 14 is moved along the Y ordinate of grid structure 18.

The phase identifying apparatus 16 includes phase comparator logic 92, a device well known to those skilled in the art, which receives the summation squarewave signal from the zero cross-over detector 90 and compares the phase of that signal to the phase of a reference signal. This reference signal is a 3KHz squarewave signal which is produced by the clock source 20, a switching logic 94 and a counter 96. Clock source 20 emits a 3MHz square-wave signal which, when the reference and summation signals coming to the comparator logic 92 are in phase with each other, is transmitted through switching logic 94 and over line 98 to the counter 96. The counter 96 is a device well known to those skilled in the art and includes a series of switching circuits. The counter is constructed to provide an output signal of fixed amplitude whose polarity shifts only in response to action of said switching circuits. These switching circuits are responsive to the incoming 3MHz signal and are constructed such that they switch the polarity of the output signal of the counter 96 whenever 500 input signal pulses are received over line 98. Counter 96 therefore transmits a 3KHz squarewave reference signal to the phase comparator logic 92. The phase comparator logic 92 compares the phase of this reference signal with the summation squarewave signal transmitted from detector 90. When the phase comparator logic 92 determines that these two signals are out of phase with each other, it transmits a signal to the switching logic 94 which alters the manner in which signals are transmitted to the counter 96 and thereby shifts the phase of the reference signal being supplied to the phase comparator logic 92.

Suppose for example, that the phase comparator logic 92 detects a phase relationship such as that shown in FIG. 10 in which the squarewave summation signal leads the squarewave reference signal by 30°. The phase comparator logic 92 would then direct the switching logic 94 to transmit one of the signal pulses from clock source 20 to counter 96 by way of line 100. This pulse would therefore bypass one of the switching circuit elements contained in the counter 96 and cause the polarity of the counter output signal to be shifted after only 499 pulses are received from the clock source 20. This advances the phase of the reference signal by 1/1,000 of a Hertz toward the summation signal. This advancement procedure will be repeated for every pulse emitted by the counter 96 for as long as the phase comparator logic 92 detects the summation signal leading the reference signal.

The entirely in-phase condition for the reference and summation signals is shown in FIG. 11. As can be seen by that figure, the reference signal has been shifted to the position occupied by the summation signal in both FIGS. 10 and 11. Thus, the reference signal has been shifted by 30° or one-twelfth a cycle. Similarly, if the phase comparator logic 92 detects the summation signal is lagging the reference signal, it directs switching logic 94 to stop transmitting signal pulses from the clock 20 to the counter 96 until the summation and reference signals are in phase with each other. Note that whenever one pulse is emitted by the clock source 20 which does not reach counter 96 the phase of the reference signal coming to the phase comparator logic 92 will be retarded by 1/1,000 of a cycle.

In the above example, the phase of the reference signal was shifted through 30° to be in phase with the summation signal. This illustration was chosen to aid understanding of the phase comparator logic 92, switching apparatus 94, and counter 96. In actual operation, these devices operate with such speed that the reference and summation signals coming to the phase comparator logic 92 will be substantially in phase with each other at all times no matter how quickly the cursor 14 is moved across the surface of the grid structure 18 and no signal difference as large as 30° will ever actually exist.

When the phase comparator logic 92 directs the switching logic 94 to either advance or retard the phase of the signal coming from the counter 96, it also directs a switching logic 102 to transmit electric signal pulses to a count storage register 104. These signal pulses act to change the count stored in that register and therefore cause that count to be an accurate record of net cursor displacement from a reference point along the Y axis of grid structure 18. The phase identification apparatus 16 is constructed such that, when the switching logic 94 and counter 96 operate to advance the phase of the reference signal by 1/1,000 of a cycle, switching logic 102 transmits one negative pulse to register 104 which decreases the count in that register by one. Similarly, when the switching logic 94 and counter 96 operates to retard the phase of the reference signal coming from counter 96 by 1/1,000 of a cycle, the switching logic 102 transmits one positive electric pulse to register 104 which increases the count in that register by one. The count stored in register 104 is therefore the net number of positive or negative pulses or phase increments that have been needed to keep the summation and reference signals in phase with each other. The count stored in register 104 is supplied to the conversion apparatus 106 which converts the count stored in register 104 to a decimal indication of cursor displacement on the surface of the grid structure 18. Since the comparator logic 92, switching logic 94, and counter 96 act to continually maintain the summation and reference signals in phase with each other, virtually any number smaller than the number representing the phase shift produced by moving the cursor completely across the grid structure 18 may appear in counter 104. This count is not limited by, say, the number of signal pulses necessary to produce a complete one cycle phase shift. For example, suppose a count of 3,100 is stored in the register 104. As has already been stated, a count of 1,000 indicates a full cycle phase shift which is provided by moving the cursor a distance equal to twice the spacing between adjacent long, parallel conducting grip portions. If the grids forming the grid structure 18 are constructed so that these parallel conducting portions are placed one half inch apart, the conversion apparatus 106 would convert a count of 3,100 coming from the register 104 to a decimal number so that output display 108 would indicate a cursor displacement of three and one-tenths inches. A negative count indicates displacement in one direction while a positive count indicates displacement in an opposite direction from a reference point along the Y axis of grid structure 18. Also note that the count stored in register 104 indicates cursor displacement with an accuracy equal to 1/500 of the spacing between two adjacent parallel conducting grid portions.

FIG. 1 shows separate output displays for indicating displacement along the X and Y axis of grid structure 18. This dual display arrangement provides a record of both the magnitude and direction of cursor displacement from a reference point. If desired, a single number indicating the straight line distance between a given point and a reference point can also be provided. The straight line distance between a point and a reference point would simply be the hypotenuse of the right triangle having two sides equal to the displacements along the X and Y axis of grid structure 18 illustrated in FIG. 1. Or, as an additional option that might be accomplished using the apparatus shown in FIG. 1, the signals from the storage register 104 could be sent directly to a computer for further processing rather than to visual output display apparatus.

The operation performed by the phase comparator logic 92, switching logic 94 and the counter 96 when reacting to a cursor displacement is being described consistently herein using the term "phase shift." It is realized that the phase and frequency of any alternating current signal are so interrelated that the operation being performed could also be described using the term "frequency shift." Whenever the phase of one signal is shifted relative to the other, the frequency of the signal being shifted is altered during the time interval during which the phase shift occurs. Admittedly, the physical operation being performed could be adequately described referring to either a "frequency shift" or a "phase shift." The term "frequency shift" is not being used because it is felt it might have suggested to some that distance between a reference point and a point of interest would also be indicated during the time interval during which one signal was actually being shifted with respect to the other. As can be seen from FIG. 1, this is not the case. When the cursor remains motionless over a point of interest, the counter 96 simply emits one pulse for every 1,000 pulses received from the clock 20 and the reference signal remains in phase with the summation signal coming from grid structure 18. The count register 104 will simply remain stored in that register and will not be increased or decreased while the cursor is held over the point of interest. The output display 108 will therefore indicate the related ordinate distance between the point of interest and the reference point as long as the cursor 14 is held over the point of interest.

In operation of the measuring device 10, an operator places the grid structure 18 over or under a surface to be measured. Since the conducting grids can be printed on very thin epoxy, glass, or plastic backings, the grid structure can be made quite flexible so that measurements need not be restricted to flat surfaces. The operator then activates the excitation or reference signal supplied to the cursor 14 and phase identification apparatus 16. The operator need not go through any long process of precisely aligning the grid structure 18 with whatever surface he wished to measure because the apparatus 10 is constructed such that any point on the grid structure surface can be selected as a reference point from which measurements are to be made. To select a point as a reference point, the operator simply places the cursor 14 directly over that point and activates a count clear or reset switch device 110 which erases the count in the coordinate registers 104. As long as the cursor 14 is not moved from this now selected reference point, a zero indication will remain in the count registers 104, and no displacement will be indicated by the output displays 108. The operator then moves cursor 14 so that the cross-hair pattern 38 appears directly over a first point of interest. As the cursor is moved across the grid structure surface, the phase of the summation induced signal shifts with respect to the reference signal. The phase comparator logic 92 along with the switching logic 94 and counter 96 act to shift the phase of the reference signal and keep the reference and summation signals continually in phase with each other. The phase comparator logic 92 in combination with the switching logic 94 also acts to keep a record of the phase shift of these two signals in a count register 104. This count is displayed by the display apparatus 108 as a decimal number indicating cursor displacement from a reference point on the grid structure 18.

Note that the specific path followed by the cursor 14 in moving from one point to another will not affect the distance measurement provided between these two points. The direction in which the phase of the summation signal shifts with respect to the reference signal depends on the direction the cursor is moved across the grid structure surface. Suppose the cursor is first moved in one direction so that the count register 104 will be increased in the positive direction. If the cursor is moved in the opposite direction, the count in register 104 will be decreased. Suppose the cursor 14 is moved from a reference point beyond a point the operator considers to be of interest and then back to that point. The count held by the register 104 when the cursor is directly over a point of interest will indicate the precise distance between the reference point and that point. In moving beyond the second point the count in register 104 will have been increased, but in moving back to that point, the count will have been decreased. Thus, extreme convenience of operation is provided. An operator can select a reference point, move the cursor to be directly over a point of interest following any path he chooses, and he will be provided with a display of the distance between the reference point and the point of interest. If he then desires to know the distance between his selected reference point and another point of interest, he simply moves the cursor from his first point of interest to the second point of interest. The output display 108 will indicate the distance between the reference point and this second point of interest. Further, if an operator desires to change his reference point after having made a number of measurements, he need only place the cursor over this newly selected point he wishes to use as a reference point and activate the count clear device 110 which erases the count in registers 104. Any further shift in the phase of the summation signal caused by cursor displacement will cause either a positive or negative increase in the count held in a register 104. The count stored in those registers will therefore indicate cursor displacement from this newly selected reference point.

Figure 12:
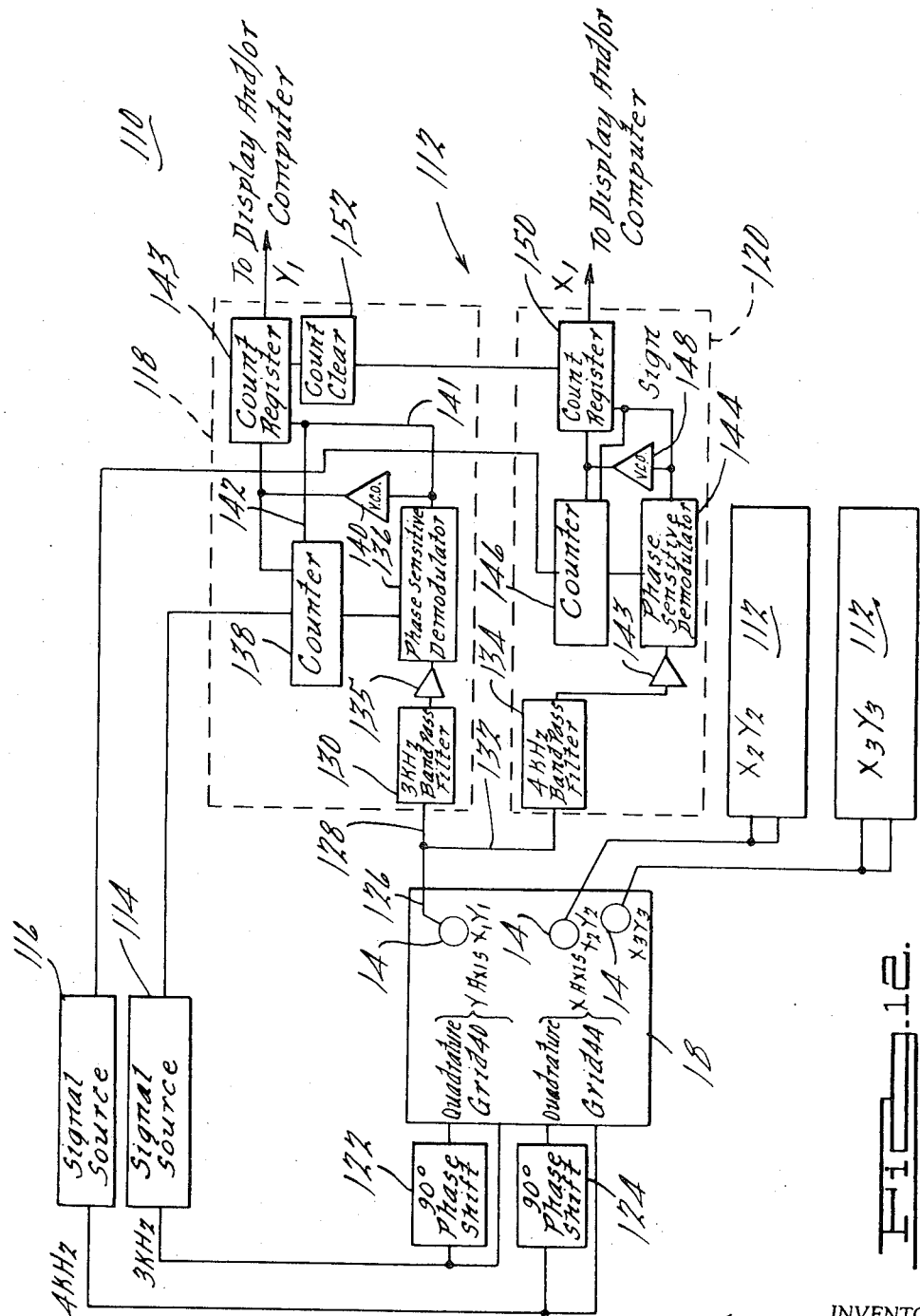
FIG. 12 is a schematic diagram illustrating an alternate embodiment of the position determining apparatus of this invention incorporated into a measuring device in which excitation signals are supplied to the grid structure and induced current signals are established in several conducting loop cursors.

2. Alternate Embodiments in Measuring Devices Employing Phase Identification Apparatus FIG. 12 illustrates a measuring device 110 embodiment of this invention in which excitation signals are supplied to the grid structure 18 rather than to the cursor 14 as they are in the embodiment of FIG. 1. The embodiment shown in FIG. 12 also illustrates alternate signal phase identification apparatus 112 from that illustrated in FIG. 1. Further, FIG. 12 shows that with this invention several identical cursors can operate independent of each other on a single grid.

The measuring device 110 shown in FIG. 12 includes the signal source 114 which transmits 3KHz sinusoidally varying signals to the Y coordinate grid 40 and quadrature grid 42 and the signal source 116 which transmits 4KHz sinusoidally varying alternating current signals to the X coordinate grid 44 and quadrature grid 46 of the grid structure 18. FIG. 12 shows the grid structure 18 generally and does not illustrate the four grids 40, 42, 44, and 46 because those grids were shown in detail and fully described in FIGS. 2 and 4. Each of the four signals supplied to the grid structure 18 acts to induce a signal in each of the illustrated cursors 14. The cursors act as electrical summers and transmit a single summed signal having signal components introduced by each of the four grid excitation signals to a signal phase identification apparatus 112.

FIG. 12 shows the apparatus 112 in detail for determining the position of only a single cursor. The apparatus for determining the positions of the other cursors is identical to that shown. Further, the signal induced in one cursor and the motion of one cursor will not affect measurements made for the position of another cursor. The phase identification apparatus 112 includes the apparatus 118 for determining the Y coordinate position of cursor 14 and apparatus 120 for determining the X coordinate position of cursor 14.

The two signal sources 114 and 116 are each similar to the signal producing apparatus 12 illustrated in FIG. 1. They are constructed, however, to produce signals having different signal characteristics. That is, source 114 transmits 3KHz signals to the Y coordinate grid of grid structure 18, and source 116 transmits 4KHz signals to the X axis of grids of that structure. Therefore, the summation signal induced in a cursor 14 can be separated into a first signal indicating displacement along the X axis of grid structure 18. FIG. 9 illustrates that the phase of a summation signal, provided by adding a first signal component induced with respect to a grid element and a second signal component, phase shifted with respect to the first signal component, and induced with respect to a quadrature grid element, will shift in proportion to cursor displacement in a direction across the long parallel conductive portions of the two grids. The cursor 14 acts as an electrical signal summer. The position determining device 110 therefore includes apparatus for shifting the phase of the excitation signals supplied to the two quadrature grids 42 and 48 instead of including apparatus for shifting the signals induced in the quadrature grids as shown in FIG. 1. The signal phase shift devices 122 and 124 which perform this phase shift are each similar to the phase shift apparatus 84 shown in FIG. 1.

The summation signal induced in cursor 14 is expressed by the mathematical equation:

$$E_{sum} = E \sin([(y/d) 360° + \omega_1 t) + E \sin[(x/d) 360° + \omega_2 t]$$

where:
- $x$ = linear cursor displacement along the X coordinate of grid structure 18.
- $\omega_1$ = frequency of signal supplied to the Y coordinate grids 40 and 42 (3KHz in this embodiment).
- $\omega_2$ = frequency of signal supplied to the X coordinate grids 40 and 42 (4KHz in this embodiment).

The remaining symbols are defined previously.
This signal is transmitted by a coaxial cable 126 through cable branch 128 to the 3KHz bandpass filter 130 and through cable branch 132 to the 4KHz bandpass filter 134. Bandpass filter 130 filters out the 4KHz signal components which indicate X coordinate position of cursor 14 and transmits a 3KHz summation signal such as the signal illustrated in FIG. 9 which indicates the Y coordinate cursor position through a gain amplifier 135 to a phase sensitive demodulator 136. The demodulator 136 also receives a 3KHz squarewave reference signal. This reference signal is provided by the signal source 114 which transmits a 3MHz squarewave signal to a counter 138 which is similar to the counter 96 illustrated in FIG. 1 and operates to reduce this 3MHz signal by a factor of 1,000 to provide the 3KHz reference signal for the demodulator 136. As FIG. 9 indicates, the phase of the summation signal transmitted to the demodulator 136 is determined by cursor position. The phase relationship between the summation and reference signals coming to the demodulator 136 determines whether or not there will be a demodulator output signal. The demodulator is so designed that there will be no demodulator output signal if the reference signal is exactly 90° out of phase with the summation signal.

Cursor motion along the Y axis of grid structure 18 shifts the phase of the summation signal and therefore provides a demodulator output signal. The demodulator output signal is transmitted to a voltage controlled oscillator 140. This oscillator responds to the demodulator output signal by transmitting signal pulses to the counter which act to shift the phase of the reference signal being transmitted to the demodulator and therefore maintain the reference signal 90° out of phase with the summation signal. The rate at which the voltage controlled oscillator emits signal pulses is determined by the magnitude of the demodulator direct current output signal. If the cursor is moved along the Y axis of grid structure 18 in a direction to cause a positive signal output from the demodulator 136, the voltage controlled oscillator 140 transmits signal pulses to the counter 138 which also receives a positive signal over line 141 through branch 142 from the demodulator 136. This positive signal causes the counter 138 to add pulses from the oscillator 140 to the pulses received from the clock source 114. These signal pulses transmitted by the voltage controlled oscillator 140 act to advance the phase of the reference signal because the counter 138 will have received 500 pulses and therefore reverse the polarity of its output signal even though the source 114 will not have emitted 500 pulses. Similarly, when the cursor 14 is moved in a direction along the Y axis of grid structure 18 to cause a negative value demodulator signal output, the signal transmitted to the counter 138 over branch 142 will direct that counter to subtract the signal pulse emitted by the voltage controlled oscillator 140 from those received from the clock source 114. These pulses therefore retard the reference signal coming to the demodulator 136.

The voltage controlled oscillator 140 transmits signal pulses to the count register 143 as well as to the register 138. Count register 143 also receives the demodulator output signal from line 141. When a positive signal is transmitted over line 141, each oscillator pulse acts to increase the count stored in that register by one, and when a negative signal is transmitted over line 141, each oscillator pulse acts to decrease that count by one. Thus, as was the case for the count register 104 illustrated in FIG. 1, there is stored in count register 143 a record of both the magnitude and direction of cursor displacement from a reference point along the Y axis of grid structure 18. Since adding or subtracting 1,000 pulses to the counter 138 will shift the phase of the reference signal by one full cycle, the count register 143 provides a measurement of cursor displacement with a resolution equal to 1/500 of the spacing between adjacent long, parallel conducting grid portions. This is identical to the resolution obtained with the device 10.

The phase identification apparatus 120 is similar to the apparatus 118, the only difference being that the apparatus 120 determines coordinate position along the X axis of grid structure 18 instead of the Y axis and is therefore sensitive to 4KHz signals instead of 3KHz signals. A signal induced in one of the cursors 14 is transmitted to its 4KHz bandpass filter 134 which filters out unwanted signal frequency components, noise signal components, and overtones and transmits a 4KHz, sinusoidally varying summation signal through a gain amplifier 143 to a phase sensitive demodulator 144. The demodulator also receives a 4KHz, squarewave reference signal from the source 116 by way of the counter 146. As was the case for the demodulator 136, the demodulator 144 emits an output signal when the summation and reference signals are not 90° out of phase with each other. This signal is transmitted to a voltage controlled oscillator 148 which acts to shift the phase of the signal coming from the counter 146 and thereby maintains a 90° phase relationship between the reference signal and the induced 4KHz summation signal as the cursor is moved along the X axis of grid structure 18. The oscillator 148 also changes the count in register 150 as it shifts the phase of the reference signal coming from the counter 146. The number stored in the register 150 therefore indicates the magnitude and direction of cursor displacement from a reference point along the X axis of grid structure 18, just as register 143 records cursor displacement along the Y axis.

Operation of the apparatus 110 illustrated in FIG. 12 is similar to operation of the apparatus 10 illustrated in FIG. 1. An operator first activates the signal sources 114 and 116 to supply excitation signals to the grid structure 18 and to the phase identifying apparatus 112. He then selects a reference point for a particular cursor 14 by placing that cursor over the point he wishes to use as a reference point and activates count clear apparatus 152, which may simply be a reset push button switch, and erases the count stored in the registers 143 and 150. As the count 14 is displaced from this selected reference point, the phase of the induced signals transmitted to the demodulators 136 and 144 will shift with respect to the squarewave reference signals supplied to those demodulators. This phase shift produces voltage outputs from the demodulator 136 and 144 which activate the voltage controlled oscillators 140 and 148 to shift the phase of the squarewave reference signals being supplied to those demodulators and to record these phase shifts in the count registers 143 and 150 respectively. Thus, the numbers stored in the registers 143 and 150 indicate cursor displacement from the selected reference point along the Y and X axes respectively of the grid structure 18.

Figure 13:
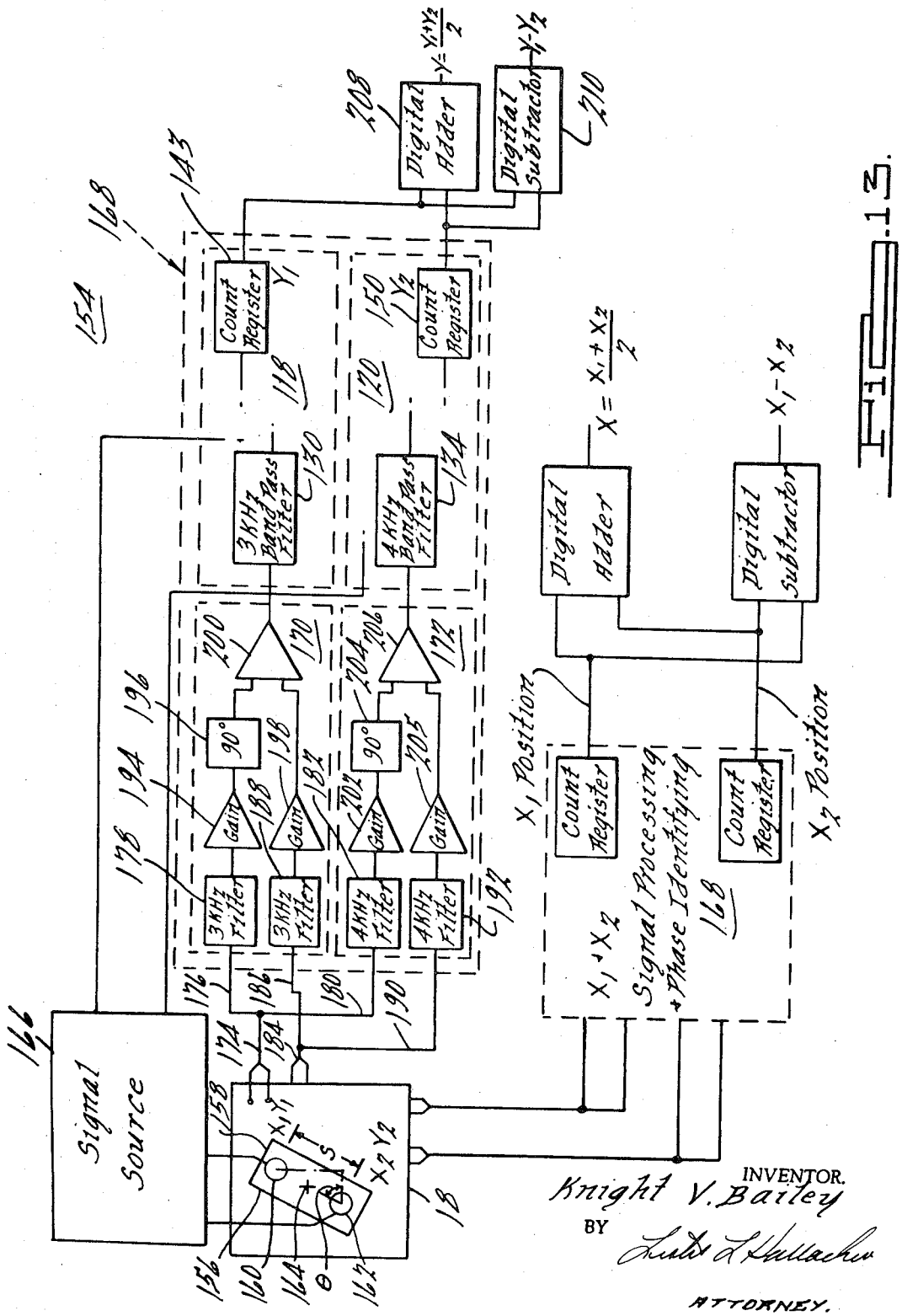
FIG. 13 is a schematic diagram illustrating this invention embodied in a measuring device which contains a cursor design having two circular conducting loops so that indications of the coordinate positions and the angular orientation of the cursor are obtained.

FIG. 13 illustrates a measuring device embodiment 154 of this invention which includes a unique, two-loop cursor 156 which enables the measurement of both coordinate position and angular orientation of the cursor. The cursor 156 thus facilitates the rapid determination of both the distance between objects on a surface such as a map placed over the grid structure 18 and the angular orientation of objects on that surface. The cursor 156 includes a transparent, rectangular shape housing member 158 which contains two circular conducting loops 160 and 162. As was the case for cursor 14, the conducting loops 160 and 162 are each of a diameter equal to an odd multiple of the spacing between adjacent long, parallel conducting grid portions 50. The centers of the two loops 160 and 162 are separated by a distance $s$ as illustrated in FIG. 13, and a reference cross-hair pattern 164 is located midway along line $s$. As illustrated, the coordinate displacement positions of the center of loop 160 are designated "$X_1Y_1$", and the coordinate displacement positions of the center of loop 162 are designated "$X_2Y_2$". The quantity $(Y_1 + Y_2)/2$ indicates the displacement along the Y axis of grid structure 18 of the cursor cross-hair 164 from a reference point, and the quantity $(X_1 + X_2)/2$ indicates the displacement along the Y axis of grid structure 18 of the cursor cross-hair 164 from a reference point. Both the quantities $(Y_1 - Y_2)$ and $(X_1 - X_2)$ are measures of the angular orientation, or in other words the angular displacement from a preselected reference position, of cursor 156 on the surface of the grid structure 18. As FIG. 13 illustrates, the length $s$ forms the hypotenuse of the right triangle formed with a first side extending from the center of loop 160 along the Y axis of grid structure 18, and with a second side extending from the center of loop 162 along the X axis of grid structure 18. Note, $\sin \theta = (Y_1 - Y_2)/s$ and $\cos \theta = (X_1 - X_2)/s$. If $s$ is chosen of unit length, $(Y_1 - Y_2) = \sin \theta$ and $(X_1 - X_2) = \cos \theta$.

The apparatus 154 which provides the above-described measurements of cursor coordinate position and angular orientation includes the alternating current signal source 166 which supplies a 3KHz sinusoidally varying alternating current excitation signal to cursor loop 160 and a 4KHz sinusoidally varying alternating current excitation signal to cursor loop 162. Each of these excitation signals acts to induce a signal in each of the grids comprising the grid structure 18. These induced signals are transmitted to a signal processing and phase identification apparatus 168 which provides output signals indicating cursor position and orientation. The apparatus 168 is shown in detail for determining Y coordinate cursor position and the quantity $\sin \theta$. The apparatus for determining X coordinate position and the quantity $\cos \theta$ is identical to that shown.

The signal processing and phase identification apparatus 168 includes signal processing apparatus 170 and phase identifying apparatus 118 for determining the Y coordinate position of loop 160 which is therefore responsive to 3KHz signals; and signal processing apparatus 172 and phase identifying apparatus 120 for determining the Y coordinate position of loop 162 which is therefore responsive to 4KHz signals. Signals from both the Y axis of grid 40 and the Y axis quadrature grid 42 are transmitted to both structures 170 and 172. Induced signals are transmitted from grid 40 by coaxial cable 174 through cable branch 176 to the 3KHz bandpass filter 178 included in the apparatus 170, and through cable branch 180 to the 4KHz bandpass filter 182 included in the apparatus 172. Signals induced in the Y axis quadrature grid 42 are transmitted by cable 184 through cable branch 186 to a 3KHz bandpass filter 188 and through cable branch 190 to a 4KHz bandpass filter 192. The bandpass filters 178, 182, 188, and 192 filter out unwanted frequent components, noise signals, and signal overtones to provide sinusoidally varying alternating current induced signals of the desired frequency for further processing. With regard to the apparatus 170, signals from the bandpass filter 178 are amplified by a gain amplifier 194 and phase shifted 90° by phase shift apparatus 196. This phase shift is identical to that described previously for the embodiments illustrated in FIGS. 1 and 12. Those illustrations show the quadrature grid signal being shifted. The signal coming from grid 40 is shifted by the apparatus shown in FIG. 13 to illustrate that either signal may be shifted as long as one is offset from the other. Signals from the bandpass filter 188 are amplified by the gain amplifier 198. The 3KHz signals from the phase shift apparatus 196 and the amplifier 198 are then transmitted to the summing amplifier 200 which provides a summation signal whose phase is measured by the apparatus 118 to thereby provide an indication of the Y coordinate displacement of loop 160. The construction and operation of apparatus 118 has been described with regard to the illustration of FIG. 12.

The apparatus 172 is similar to the apparatus 170. Signals transmitted by the 4KHz filter 182 are amplified by the gain amplifier 202 and phase shifted 90° by the phase shift apparatus 204. Signals transmitted by the bandpass filter 192 are amplified by the gain amplifier 205. The 4KHz signals from the phase shift apparatus 204 and the amplifier 205 are transmitted to the summing amplifier 206 which provides a summation signal whose phase shifts in proportion to displacement of the cursor loop 162. These phase shifts are measured by the apparatus 120, in the manner shown and fully described in the embodiment of FIG. 12. The signal output from the structures 118 and 120 indicate Y coordinate displacement of the cursor loops 160 and 162, respectively. These signals are transmitted to a digital adder 208 which determine displacement along the Y coordinate of grid structure 18 of the cursor cross-hair 164 from a reference point by summing these two signals and dividing by a factor of two. The angular orientation ($\theta$) of cursor 156 with respect to a chosen reference orientation is determined by the digital subtractor 210 which subtracts the signals received from the apparatus 120 from the signals received from apparatus 118. The subtractor 210 provides an output signal equal to ($Y_1 - Y_2$) which is proportional to $\sin \theta$ and therefore indicates the magnitude and direction of any change in cursor orientation. Signals from the X coordinate grids 44 and 46 are processed in an identical manner by identical structure and therefore provide measurements of cursor displacement along the X axis of grid structure 18 and $\cos \theta$.

Operation of the measuring device 154 is similar to operation of the devices 10 and 110 described previously. Excitation signals supplied to the cursor loops 160 and 162 induce signals in each of the grids forming the grid structure 18. The apparatus 168 receives these induced signals and processes these signals to provide a plurality of summation signals that shift in phase in response to displacement of one or the other of the cursor loops 160 and 162. The apparatus 168 measures the change in phase of these signals caused as the cursor 156 is moved across a surface of the grid structure 18. An operator selects a reference point and reference angular orientation of the cursor 156 with respect to the grid structure 18 by simply placing the cursor cross-hair pattern 164 directly over the desired reference point, rotating the cursor 156 so that it is aligned along the desired reference axis, and erasing the count in registers 143 and 150. The count in these registers will then change only in response to the phase shift caused by cursor displacement from this reference position. Ordinate displacement of cursor 156 is thus indicated by the digital adder 208 and rotational displacement of said cursor will be indicated by the digital subtractor 210.

Figure 14:
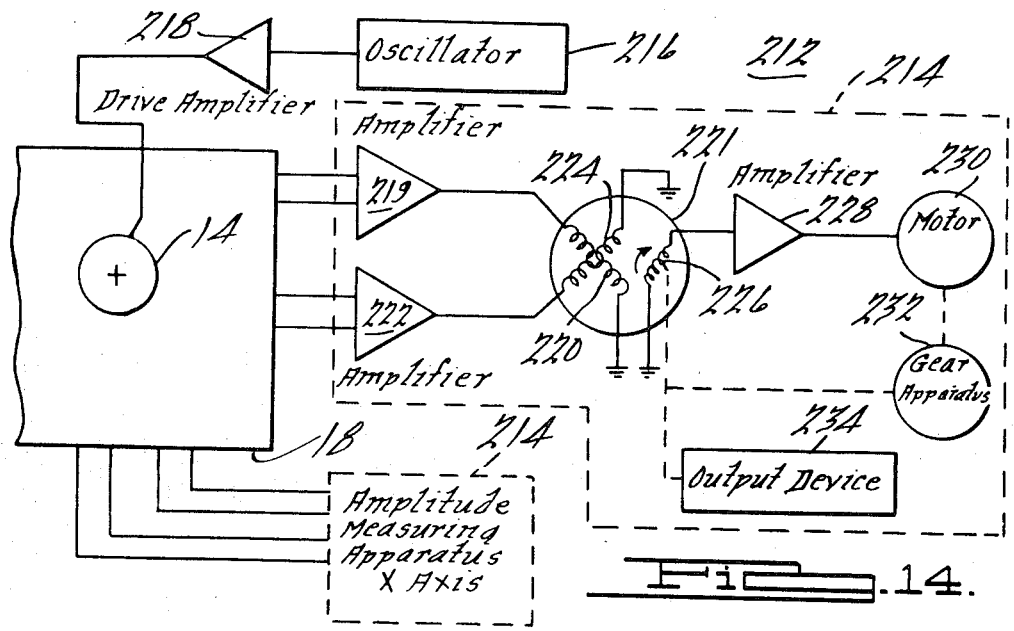
FIG. 14 is a schematic diagram which illustrates a measuring device embodiment of this invention which includes two structures each of which compares the change in amplitude of one induced signal with the change in amplitude of another induced signal to determine the position of a cursor on the surface of a grid structure.

3. A Measuring Device Embodiment of this Invention Employing Signal Amplitude Ratio Measuring Apparatus for Determining Cursor Position FIG. 14 illustrates a position-measuring device 212 which employs signal amplitude measuring apparatus 214 to provide measurements of cursor position which are as accurate as those obtainable with the phase measuring apparatuses previously described. FIG. 14 illustrates a unique coordinate position measuring device for determining the X and Y coordinates of a point. The apparatus 214, however, is known in the art and has been previously used with devices for providing measurements along a single coordinate. Therefore, only a brief detailed description of that apparatus is included herein.

An oscillator 216 and coil drive amplifier 218 supply an alternating current excitation signal to the cursor 14. This excitation signal induces a signal in each of the grid elements forming the grid structure 18. The maximum amplitude of these induced signals varies sinusoidally as the cursor 14 is moved across the surface of the grid structure 18. This sinusoidal variation is illustrated by the graph of FIG. 6. The measuring apparatus 214 is illustrated in detail for measuring displacement along the Y axis of grid structure 18. Identical structure measures cursor displacement along the X axis of grid structure 18. Signals induced in the grid 40 are amplified by an amplifier 219 and transmitted to a primary winding 220 of a mechanical resolver 221. Signals from the quadrature grid 42 are amplified by an amplifier 222 and transmitted to another primary winding 224 of the resolver 221. The electrical signals supplied to the primary windings 220 and 224 each act to induce a signal in a rotatable secondary winding 226. The maximum amplitude of the signal induced in this rotatable winding depends not only on the maximum amplitudes of the signals supplied to the two primary windings 220 and 224 which vary sinusoidally as the cursor 14 is moved across the surface of the grid structure 18, but also upon the angular orientation of the rotatable winding or rotor 226 with respect to those primary windings. For instance, when the rotor winding 226 is parallel to winding 224, there will be a maximum coupling between the two windings. But when the rotor winding is perpendicular to the winding 224, there will be no coupling between the two windings and no signal can be induced in the rotor 226 from the winding 224. The signal induced in the rotor 226 ($E_{rotor}$), which also equals the output signal for the resolver 221, is expressed mathematically by the equation:

$$E_{(rotor)} = A E \sin [(y/d) 360°] \cos \theta - A E \cos [(y/d) 360°] \sin \theta$$

where:

$\theta$ = the angle of rotation of rotor, and

The other terms are as described previously.

Straightforward mathematical manipulation produces:

$$E_{(rotor)} = A E \sin[(y/d) 360° - \theta)]$$

This equation shows that the output from the resolver 221 changes as the cursor is moved along the Y coordinate of grid structure 18. The above equation also shows that the output from the resolver 221 changes as $\theta$ is changed by rotor rotation. If the rotor 226 is made to rotate as the cursor 14 is displaced along the Y axis of grid structure 18 so that $\theta = (y/d) 360°$, the resolver output will be driven to zero. Amplifier 228, electric motor 230, and gear apparatus 232 operate to rotate the rotor 226 in this manner to drive the output of the resolver 221 to zero. Resolver output signals are amplified buy the amplifier 228 and drive the electric motor 230. This motor drives the gear apparatus 232 which turns the rotor 226 to align it with the primary windings of the resolver so that no net electric signal is induced in the rotor. The gear structure 232 also changes the output signal value stored in the output device 234 in proportion to the magnitude of the angle $\theta$ through which it rotates the rotor 226. The function of the output device 234 is identical to the functions of the count register 104, converter 106 and display 108 illustrated in FIG. 1. It records the distance the cursor has been displaced on the surface of the grid structure 18. Since the amplitude measuring apparatus 214 includes a substantial amount of mechanical apparatus, the output device 234 would most likely be a device such as a shaft encoder, a mechanical counter, or a potentiometer. The signal stored in the output device 234 would be increased in response to cursor motion in one direction, and decreased in response to cursor motion in an opposite direction.

Operation of the position determining device 212 is similar to operation of the devices previously described. An operator selects a reference point on the surface of the grid structure 18 simply by placing the cursor 14 over that point and clearing the signal stored in the output device 234. As the cursor 14 is displaced along the Y axis of grid structure 18 from this reference point, the signals supplied to the resolver windings 220 and 224 will change sinusoidally and therefore induce a current in the rotor 226 which flows to the amplifier 228. This amplified signal is then sent to the electric motor 230 which drives the gear structure 232. The gear structure 232 turns the rotor 226 so that there will be no net induced signal output from the resolver 221. The gear structure 232 also simultaneously changes the signal stored by the output device 234 so that the output device 234 provides a measurement of cursor displacement on the surface of the grid structure 18.

4. Automatic Plotting Device Embodiments of the Subject Invention

Figure 16:
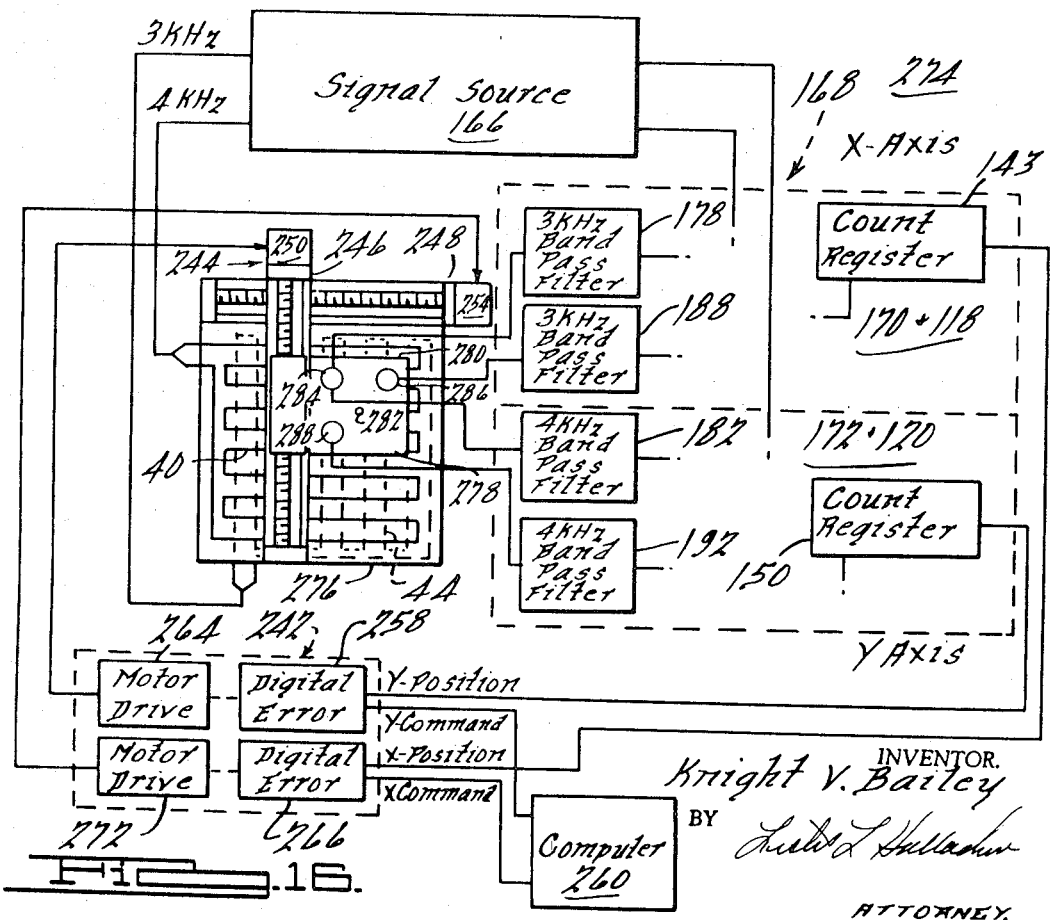
FIG. 16 is a schematic diagram which illustrates an automatic plotting device embodiment of this invention which includes a cursor having several offset conducting loops so that several signals indicating cursor position are obtained simultaneously with respect to a single grid.

The plotting device illustrated in FIGS. 15 and 16 are similar to the position measuring devices previously illustrated. Discussion will first be provided with respect to the plotting device 236 illustrated in FIG. 15. Plotting device 236 includes the signal producing apparatus 12, the signal processing apparatus 20, phase identification apparatus 16, and the grid structure 18 already shown and discussed with regard to the measuring apparatus 10 illustrated in FIG. 1. Further, the illustrated cursor 238 is simply the cursor 14 already described with a plotting pen 240 attached thereto. The phase identification apparatus 16 provides an output signal indicating the position of the cursor 238 on the surface of the grid structure 18. In the plotter device 236, these output signals are not merely sent to the display registers but are compared with preselected command signals which represent particular positions on the surface of the grid structure 18 by the electronic comparator apparatus 242. The signal differences between these command signals and the signals representing measurements of cursor position are used to drive mechanical drive apparatus 244 which moves the cursor 238 to the grid positions represented by the command signals.

FIG. 15 illustrates conventional mechanical drive apparatus 244 for moving the cursor 238 and therefore pen 240 across the surface of grid structure 18. Mechanical drive apparatus 244 includes two carriages 246 and 248. Carriage 246 includes the electric motor 250 and gear train 252 which is attached to cursor 238 and operates to move that cursor along the Y axis of grid structure 18. Carriage 246 is mounted on carriage 248 which includes the electric motor 254 and gear train 256. The carriage 248 moves the carriage 246 and therefore the cursor 238 along the X axis of grid structure 18. The signal producing apparatus 12 supplies an excitation signal to the circular conducting loop 34 of cursor 238. This excitation signal induces a signal in each of the grids forming the grid structure 18. These induced signals are transmitted to the signal processing apparatus 20 and phase identification apparatus 16 which provides output signals indicating cursor coordinate position. A signal indicating cursor position along the Y coordinate of grid structure 18 is supplied to the digital error register 258 which also receives a command signal from the computer 260. The command signal represents a particular Y coordinate position on the surface of the grid structure 18. The register 258 compares these two signals and if they are not equal, provides an output signal equal to the difference between the command and measured signals which acts to drive the cursor 238 to the grid position represented by the Y coordinate command signal. The output signal from the digital error register 258 is converted to proper form for driving motor 250 by a digital to analogue converter 260, a gain amplifier 262, and a motor drive amplifier 264.

Similarly, apparatus 16 transmits a signal indicating cursor position along the X coordinate of grid structure 18 to the digital error register 266. This register also receives a command signal from computer 260 which represents a particular position along the X axis of grid structure 18. The error register 266 is similar to the error register 258 and compares the measured and command X axis signals to provide an output signal equal to the difference between these two signals. This output signal is used to drive the cursor 238 to the position represented by the X coordinate command signal. The output signal from the error register 266 is converted to the proper form for driving the electric motor 250 by the digital to analogue conversion apparatus 268, gain amplifier 270 and motor drive amplifier 272. The timing of the command signals supplied by the computer 260 to the digital error register 258 and 266 determines the path that the cursor 238 will follow in proceeding from one position to another. That is, if the X and Y command signals are supplied simultaneously, the drive motors 250 and 254 will also operate simultaneously to move the cursor 238 along the straight line directly from one point to another. If desired, however, a command signal to one error register, say the register 258, can be supplied before a command signal is provided by the register 266. The cursor 238 would then move from one point to another by first moving along the Y axis of grid structure 18 and then along the X axis of that grid structure. In operation, the pen 240 is placed at a reference point from which it is desired to begin plotting, and the signals stored in the digital error registers 258 and 266 and count registers 104 are set to zero. The computer 260 then provides the first of a preselected series of command signals to those registers. At first, before cursor 238 has had a chance to move, there will be no signal coming from the phase identifying apparatus 16 to the registers 258 and 266. The command signals will, therefore, be transmitted from the error registers to the drive motors 250 and 254. As the cursor 238 moves across the surface of the grid structure 18, the phase identifying apparatus 16 will provide electric signals to the registers 258 and 266. The mechanical drive apparatus 244 operates to move the cursor 238 across the grid structure surface so that the signals coming from the phase identifying apparatus approach and finally equal the command signals coming from the computer 260. When the two signals are equal, the cursor and plotting pen 240 will be at the coordinate position represented by the first set of command signals. The computer 260 then switches to provide a second set of command signals to the registers 258 and 266. The command signals will again be unequal to the signals coming from the phase identifying apparatus 16 and the registers 258 and 266 will provide output signals that will drive the cursor 238 to the grid position represented by this new set of command signals. This process is repeated with successive sets of command signals until a complete plot is achieved.

Note that command signals of any desired magnitude may be used to drive this plotting apparatus. That is, a command signal large enough to move the plotting pen 240 across a number of long, parallel conducting grid portions can be supplied to the error registers and the pen will respond by moving across the desired distance. However, as was the case for the measuring device discussed herebefore, a very fine resolution can also be achieved with this device. Using the phase identifying apparatus 16, plotting motions as small as 1/500 of the distance between two long, parallel adjacent conducting grid portions can be produced. Since there are no limits as to what the spacing between the parallel conducting grid portions must be, a properly chosen series of command signals will produce an extremely accurate plot of any desired curve or line.

FIG. 16 illustrates an automatic plotting device 274 which includes alternate grid structure 276 and cursor 278 embodiments from those illustrated previously. The remaining apparatus illustrated in FIG. 16 is identical in both construction and operation to that included in the other embodiments of this invention shown herein and has been fully described. That is, the alternating current signal source apparatus 166 and the signal processing and phase identification apparatus 168 are both shown in FIG. 13. The electronic comparator apparatus 242, mechanical drive apparatus 244, and computer 260 are all included in the automatic plotter embodiment of FIG. 15.

Figure 2:
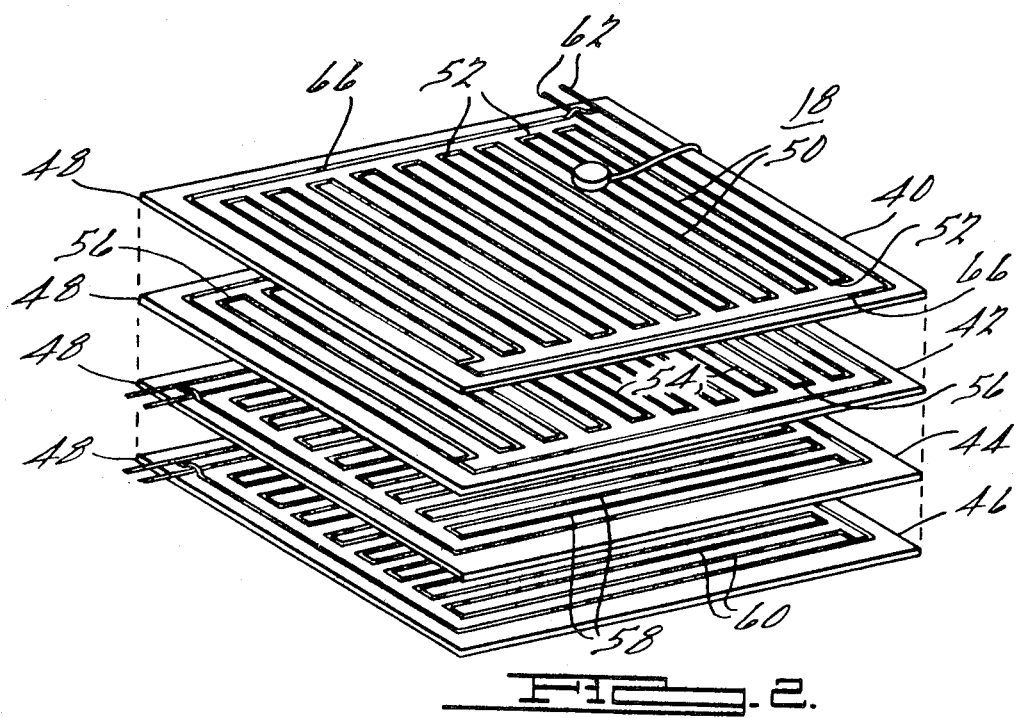
FIG. 2 is an enlarged and exploded perspective view, partly schematic, of the grid structure and circular loop cursor illustrated in FIG. 1 and in subsequent embodiments of this invention.

Grid structure 276 is formed from the two grids 40 and 44 illustrated in FIG. 2. The long, parallel conducting grid portions 50 of grid 40 run perpendicular to the long, parallel conducting grid portions 58 of grid 44, but the quadrature grids 42 and 46 included in the grid structure 18 are not included in the grid structure 276. The cursor 278 comprises a plastic housing plate 280 which holds a plotting pen 282 and the three circular conducting loops 284, 286, and 288. Each of the circular conducting loops has a diameter equal to an odd multiple of the spacing between adjacent, long parallel grid conducting portions. The center of loop 286 is displaced from the center of loop 284 a distance along the X axis of grid structure 276 equal to an odd multiple of half the distance between adjacent long, parallel grid conducting portions. The center of loop 288 is spaced a similar distance along the Y axis of grid structure 276 from the center of loop 284. The conducting loops 286 and 288 therefore act as "quadrature" loops to the loop 284.

Signal source apparatus 166 provides a 4KHz excitation signal to the Y coordinate grid 40 and a 2KHz excitation signal to the X coordinate grid 44 of the grid structure 276. Each of these excitation signals acts to induce a signal in each of the three conducting cursor loops. These loops act as electrical summers and therefore transmit signals having both 3KHz and 4KHz signal components. Signals induced in circular loops 284 and 286 are transmitted to the 3KHz bandpass filters 178 and 188 respectively which transmit the 3KHz signal components for further processing by sections 170 and 118 of the apparatus 168 as described with respect to FIG. 13. Section 118 therefore provides an output signal indicating X coordinate position of the cursor 278. Signals induced in the circular loops 284 and 288 are transmitted to the 4KHz bandpass filters 182 and 192 respectively which transmit the 4KHz signal components for further processing by sections 172 and 120 of the apparatus 168 which are also described with respect to FIG. 13. Section 120 therefore provides an output signal indicating Y coordinate position of the cursor 278. The signal outputs from the sections 118 and 120 of the signal processing and phase identifying apparatus 168 are compared to command signals from the computer 260 by the apparatus 242 as was the case for the plotter 236 illustrated in FIG. 15. The signal differences between the command and measured signals are then used to drive the mechanical drive apparatus 244, also illustrated in FIG. 15, to move the cursor 278 and plotting pen 282.

It is believed that the entire disclosure just provided will suggest a great many obvious modifications to each of the single embodiments disclosed herein. For example, the specific structures illustrated in one embodiment could easily be replaced by a structure illustrated in another. As a second example, note the cursor 278 illustrated in FIG. 16 is rigidly mounted to the carriage 246 and therefore will not rotate. Since rotation is not a problem the three conducting loops 284, 286, and 288 need not be circular. The same signal output could be provided using conducting loops of any shape having a transverse dimension equal to an odd multiple of the spacing between adjacent, long, parallel conducting grid portions. Therefore, while but six preferred embodiments of the present invention have been described, it should be understood that various changes, adaptions, and modifications may be made therein without departing from the spirit of the invention and the scope of the appending claims.

What is claimed is:

1. An automatic plotting system comprising:

a grid structure, said grid structure including a first continuous conductive grid element having a first plurality of equally spaced parallel portions arranged such that currents in all adjacent conductors flow in opposite directions, said first grid element being parallel to said surface and defining a first coordinate on said surface; said grid structure also including a second continuous grid element having a second plurality of equally spaced parallel portions perpendicular to said first plurality of parallel portions arranged such that currents in all adjacent conductors flow in opposite directions, said second grid element being parallel to said surface and defining a second coordinate on said surface;

a cursor structure having at least one conductive element;

means for energizing one of said structures to establish voltage induction between the conductive elements of said structures so that relative movement between said structures induces voltages in the conductive elements of the other of said structures, and utilization means responsive to said voltages for utilizing said voltages as output signals indicative of the position of said cursor relative to said reference position;

said cursor structure being dimensioned with respect to said spacing of said parallel portions such that a varying signal is induced in at least one of said conductive elements because of said induction between said cursor structure and said grid structure;

means responsive to said variable signal as said cursor device is moved across said grid structure to provide coordinate output signals indicating cursor displacement along said grid structure;

means for providing command signals;

means for comparing said coordinate output signals to said command signals to produce an error signal representative of the difference between said coordinate output signals and said command signals; and means responsive to said error signal for moving said cursor across said grid structure surface.

2. The system of claim 1 further including means for converting said variable signal into digital position signals; and wherein said command signals are digital command signals representative of a desired position of said cursor.

3. The system of claim 2 wherein said means for comparing is a digital comparison means responsive to said digital position signals and said digital command signals so that said error signal is a digital signal.

4. The system of claim 3 wherein said means responsive to said error signal includes a digital to analog converter for converting said digital error signal to an analog drive signal; and further including cursor drive means responsive to said analog drive signal.

5. The system of claim 4 wherein said means for providing command signals is a digital computer for storing desired positions of said cursor as said digital command signals.

6. The system of claim 2 wherein said digital position signals are separated into X axis signals and Y axis signals;

wherein said means for comparing includes an X axis digital comparison means and a Y axis digital comparison means; and wherein said command signals are digital command signals, said digital comparison means being responsive to the respective axis signals and said digital command signals to respectively generate an X error signal and a Y axis error signal.

7. The system of claim 6 wherein said means responsive to said error signal includes an X axis digital-to-analog converter for converting said X axis error signal to an X axis analog drive signal, and a Y axis digital-to-analog converter for converting said Y axis error signal to a Y axis analog drive signal; and further including X axis cursor drive means and Y axis cursor drive means respectively responsive to said X and Y analog drive signals for driving said cursor to a commanded position.

* * * * *